United States Patent [19]

Fukushima et al.

[11] Patent Number: 5,699,187
[45] Date of Patent: Dec. 16, 1997

[54] OPTICAL COUPLER

[75] Inventors: Nobuhiro Fukushima; Hideki Noda; Hiroaki Matsuda, all of Kawasaki, Japan

[73] Assignee: Fujitsu Limited, Kawasaki, Japan

[21] Appl. No.: 190,128

[22] PCT Filed: Jun. 16, 1993

[86] PCT No.: PCT/JP93/00814

§ 371 Date: Feb. 3, 1994

§ 102(e) Date: Feb. 3, 1994

[87] PCT Pub. No.: WO94/00782

PCT Pub. Date: Jan. 6, 1994

[30] Foreign Application Priority Data

Jun. 19, 1992 [JP] Japan .................. 4-160493
Jul. 23, 1992 [JP] Japan .................. 4-196837

[51] Int. Cl.⁶ .................................. G02B 1/10
[52] U.S. Cl. .................. 359/583; 359/359; 359/580; 359/629
[58] Field of Search .................... 359/352, 359, 359/580, 582, 583, 584, 586, 588, 618, 629, 634

[56] References Cited

U.S. PATENT DOCUMENTS

| | | | |
|---|---|---|---|
| 2,815,695 | 10/1957 | Scharf et al. | 359/583 |
| 3,559,090 | 1/1971 | Refermat et al. | 359/583 |
| 3,741,625 | 6/1973 | Saleh | 359/583 |
| 4,373,782 | 2/1983 | Thelen | 359/583 |
| 4,415,233 | 11/1983 | Itoh et al. | 359/582 |
| 4,662,722 | 5/1987 | Buczek et al. | 359/584 |
| 4,733,926 | 3/1988 | Title | 359/352 |
| 4,765,715 | 8/1988 | Matsudaira et al. | 359/583 |
| 4,821,282 | 4/1989 | Podgorski | 372/99 |
| 5,061,050 | 10/1991 | Ogura | 359/589 |

FOREIGN PATENT DOCUMENTS

| | | | |
|---|---|---|---|
| 0228042 | 7/1987 | European Pat. Off. | |
| 2332254 | 1/1975 | Germany | 359/583 |
| 224684 | 7/1985 | Germany | 359/352 |

(List continued on next page.)

OTHER PUBLICATIONS

V. R. Costich, "Reduction of Polarization Effects in Interference Coatings," *Applied Optics*, vol. 9, No. 4, Apr. 1970, pp. 866 to 870.

*Primary Examiner*—Paul M. Dzierzynski
*Assistant Examiner*—Darren E. Schuberg
*Attorney, Agent, or Firm*—Staas & Halsey

[57] ABSTRACT

An optical coupler divides signal light beam in optical transmission path at predetermined ratio. The optical coupler includes single-layer dividing film evaporated on substrate with optical film thickness being of predetermined value, the film having refractive index which is equal to or smaller than square root of refractive index of substrate, and coupler holder holding single-layer dividing film in optical transmission path to apply signal light beam to single-layer dividing film at incident angle of about 45 degrees. Alternatively, optical coupler includes dividing film made of three films having respective refractive indexes of 1.46±0.10, 1.65±0.10, and 2.30±0.10 and formed in four, five, or seven layers on substrate having refractive index of 1.51±0.10 or 3.50±0.20, each layer having optical film thickness which reduces polarization dependency of dividing ratio of dividing film, and coupler holder holding dividing film in optical transmission path to apply signal light beam to the dividing film at incident angle of about 45 degrees. Alternatively, optical coupler includes dividing film made of two films having respective refractive indexes of 1.46±0.10 and 2.30±0.10 and formed in four through fourteen layers on substrate having refractive index ranging from 1.51±0.10 to 3.50±0.20, each layer having optical film thickness which reduces the polarization dependency of dividing ratio of the dividing film, and coupler holder for holding dividing film in optical transmission path to apply signal light beam to dividing film at incident angle of about 45 degrees.

14 Claims, 33 Drawing Sheets

FOREIGN PATENT DOCUMENTS

| | | |
|---|---|---|
| 56-138707 | 10/1981 | Japan . |
| 58-208702 | 12/1983 | Japan . |
| 59-19917 | 2/1984 | Japan . |
| 60-159821 | 8/1985 | Japan . |
| 61-110101 | 5/1986 | Japan . |
| 62-39801 | 2/1987 | Japan . |
| 62-163001 | 7/1987 | Japan . |
| 63-8702 | 1/1988 | Japan . |
| 63-311201 | 12/1988 | Japan . |
| 1-99004 | 4/1989 | Japan . |
| 1-285901 | 11/1989 | Japan . |
| 2-239237 | 9/1990 | Japan . |
| 6-174905 | 6/1994 | Japan ........... 359/583 |
| 1720795 | 4/1992 | U.S.S.R. ........... 359/583 |

OPTICAL COUPLER

TECHNICAL FIELD

The present invention relates to an optical coupler for dividing a signal light beam at a predetermined ratio in an optical apparatus, an optical communication system, or the like, and more particularly to an optical coupler for dividing a portion of a signal beam transmitted from a light emitting device such as a semiconductor laser or the like through an optical fiber and monitoring the divided signal beam for the optical intensity or the like of the signal light beam.

BACKGROUND ART

In recent years, research efforts have intensively been made with respect to optical amplifiers for directly amplifying light as it is. In an optical transmission path having an optical amplifier, it is necessary to keep constant the intensity of a signal light beam transmitted over the optical transmission path. To meet such a requirement, the intensity of the signal light beam has to be monitored accurately. An optical coupler is known as a device for monitoring the intensity of the signal light beam.

A general optical coupler comprises a dividing film inserted at an angle to the optical path for reflecting a portion of the signal light beam thereby to divide the light beam. The dividing film is preferably inserted at 45 degrees to the optical path so that the divided light beam is bent 90 degrees with respect to the optical path. Such an arrangement allows the optical amplifier to be simplified in structure and reduced in size.

The divided light beam produced by the optical coupler is used to monitor the intensity of the signal light beam. It is therefore necessary that the ratio of the divided light beam to the signal light beam be constant. If the angle at which the signal light is applied to the dividing film is large (the angle of 45 degrees belongs to a large range), then the dividing ratio is unstable in time due to the polarization dependency of the dividing film. Therefore, there is a demand for an optical coupler which is less susceptible to the polarization dependency.

FIG. 1(A) is a view illustrative of a conventional optical coupler. In FIG. 1(A), a multilayer dividing film 200 is disposed on a surface of a substrate 100 of optical glass. The multilayer dividing film 200 is formed by evaporating silicon dioxide ($SiO_2$) or the like several times on the substrate 100 of optical glass. The substrate 100 with the multilayer dividing film 200 deposited thereon is inserted in an optical path.

A signal light beam P0 applied from a transmission path is divided by the dividing film 200 into a signal light beam (divided light beam P1) reflected by the dividing film 200 and a signal light beam (transmitted light beam P2) transmitted through the dividing film 200. The divided light beam P1 is used to monitor the intensity of the signal light beam P0.

FIG. 1(B) is a diagram showing the transmission characteristics of the conventional optical coupler shown in FIG. 1(A) at the time the signal light beam is applied at an incident angle of 45 degrees. The horizontal axis of FIG. 1(B) represents the wavelength λ (nm) of the incident light beam and the vertical axis thereof represents the transmittance T (%). Tp and Ts indicate the transmittances (%) of respective P- and S-polarized light contained in the signal light beam.

If the incident angle of the signal light beam P0 is 45 degrees for the reason described above, then the polarization dependency of the dividing ratio by the dividing film 200 is large. Specifically, an incident signal light beam generally contains P- and S-polarized light at a ratio that varies with time. As shown in FIG. 1(B), the transmittances T (%) of the P-polarized light (Tp) and the S-polarized light (Ts) differ from each other. Therefore, the total dividing ratio varies as the ratio of the P- and S-polarized light varies. Consequently, the intensity of the divided light beam P1 may vary greatly even when the intensity of the incident signal light beam is constant.

If the incident angle is 5 degrees, for example, then the polarization dependency of the dividing ratio of the conventional dividing film 200 is reduced. The reason why the polarization dependency is reduced will be described below with reference to FIG. 2.

FIG. 2 is a graph showing the relationship between the loss difference, the incident angle, and the dividing ratio. The reflected component of the incident light power being regarded as a loss, the loss difference is the difference between the reflected P-polarized light and the reflected S-polarized light. The curve a indicates a dividing ratio of 1:10, the curve b indicates a dividing ratio of 1:6, and the curve c indicates a dividing ratio of 1:2. At smaller incident angles, the loss difference is smaller with respect to all the dividing ratios. As the incident angle increases, the loss difference increases. In particular, the greater the dividing ratio, the larger the loss difference. In order to divide an incident light beam with an optical coupler, it is customary to select the incident angle to be 45 degrees. With the incident angle of 45 degrees, the loss difference between the P- and S-polarized light reflected by an optical coupler whose dividing ratio is 1:10 is 6.7 dB, the loss difference between the P- and S-polarized light reflected by an optical coupler whose dividing ratio is 1:6 is 5.2 dB, and the loss difference between the P- and S-polarized light reflected by an optical coupler whose dividing ratio is 1:2 is 1.6 dB. To obtain a stable optical coupler, it is necessary to keep the loss difference within about 0.1 dB for practical reasons if the dividing ratio is 1:10.

As can be seen from FIG. 2, if the incident angle is 5 degrees, then the polarization dependency is very small. However, such an incident angle setting eliminates the freedom of the layout of the optical coupler, and causes the optical amplifier and the like to increase in size.

It is known that the polarization dependency of the dividing ratio is reduced if the dividing film is made of a material having a high refractive index, e.g., silicon (Si). However, the process of evaporating a dividing film of silicon on a glass substrate involves more difficulties than the process of evaporating a general material such as $TiO_2$, $SiO_2$, or the like, and the dividing film of silicon is of poor stability. The process of evaporating $TiO_2$, $SiO_2$, or the like has already been established, and can easily and stably fabricate dividing films.

DISCLOSURE OF THE INVENTION

In view of the aforesaid problems, it is an object of the present invention to provide an optical coupler having a dividing film which is inexpensive and stable and has a dividing ratio whose polarization dependency is very small even when a signal light beam is applied at an incident angle in the vicinity of 45 degrees.

To achieve the above object, there is provided in accordance with the present invention an optical coupler for dividing a signal light beam in an optical transmission path at a predetermined ratio, comprising a single-layer dividing film evaporated on a substrate as a single layer of a film material with an optical film thickness thereof being of a predetermined value, the film material having a refractive index which is equal to or smaller than the square root of a refractive index of the substrate, and holder means for holding the single-layer dividing film in the optical transmission path such that the signal light beam is applied to the single-layer dividing film at an incident angle of about 45 degrees.

According to the present invention, there is also provided an optical coupler for dividing a signal light beam in an optical transmission path at a predetermined ratio, comprising a dividing film made of three film materials having respective refractive indexes of 1.46±0.10, 1.65±0.10, and 2.30±0.10 and formed in four, five, or seven layers on a substrate having a refractive index of 1.51±0.10 or 3.50±0.20, the layers being combined in such a combination and each having such an optical film thickness as to reduce the polarization dependency of the dividing ratio of the dividing film, and holder means for holding the dividing film in the optical transmission path such that the signal light beam is applied to the dividing film at an incident angle of about 45 degrees.

According to the present invention, there is further provided an optical coupler for dividing a signal light beam in an optical transmission path at a predetermined ratio, comprising a dividing film made of two film materials having respective refractive indexes of 1.46±0.10 and 2.30±0.10 and formed in four through fourteen layers on a substrate having a refractive index ranging from 1.51±0.10 to 3.50±0.20, the layers being combined in such a combination and each having such an optical film thickness as to reduce the polarization dependency of the dividing ratio of the dividing film, and holder means for holding the dividing film in the optical transmission path such that the signal light beam is applied to the dividing film at an incident angle of about 45 degrees.

BEST MODE FOR CARRYING OUT THE INVENTION

Embodiments of the present invention will hereinafter be described below with reference to the drawings.

First, a first embodiment of the present invention will be described below. Prior to the description of the first embodiment, the principles of the first embodiment will be described below with reference to FIGS. 3 and 4.

Figure 1A:
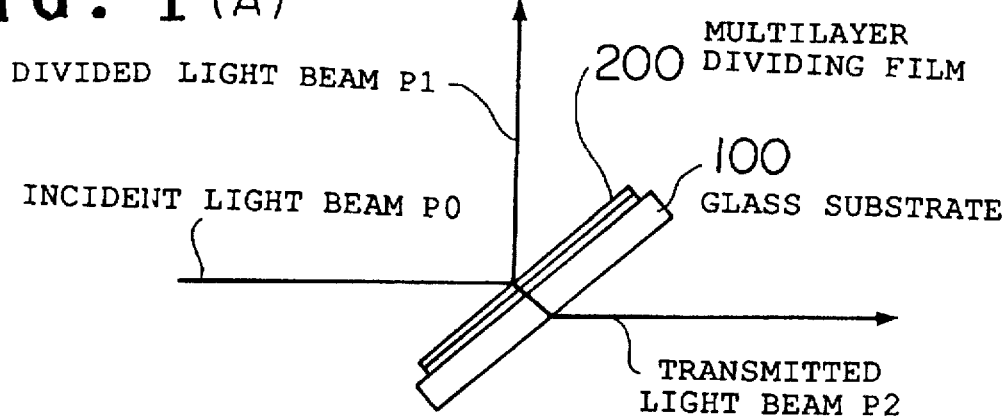
FIG. 1(A) is a view illustrative of a conventional optical coupler.
Figure 1B:
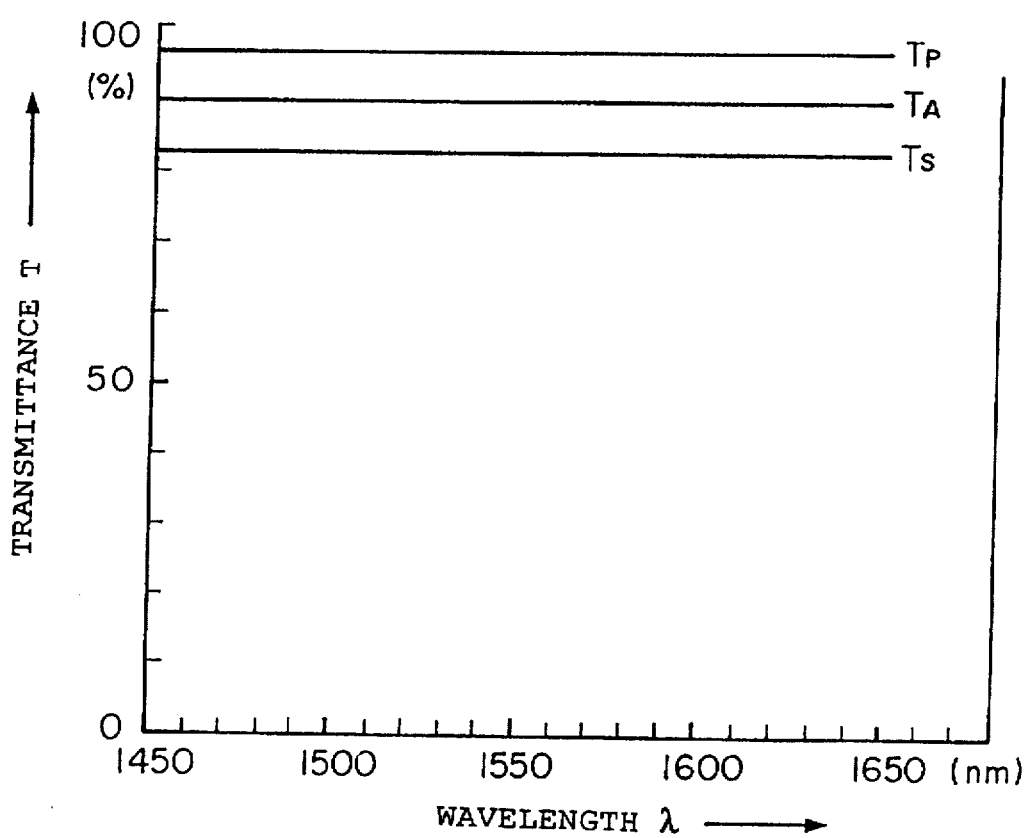
FIG. 1(B) is a diagram showing the transmission characteristics of the conventional optical coupler shown in FIG. 1(A) at the time a signal light beam is applied at an incident angle of 45 degrees.
Figure 2:
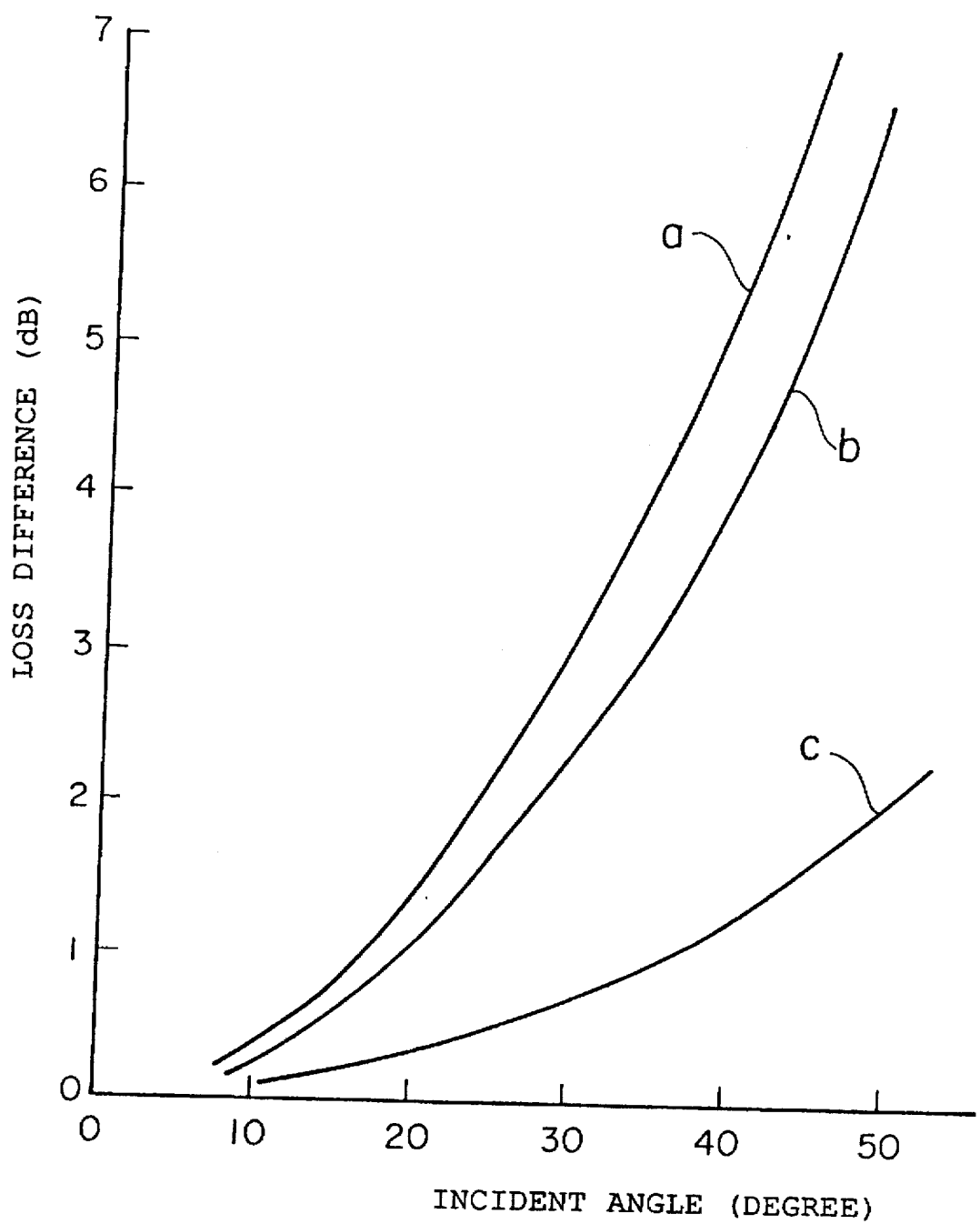
FIG. 2 is a graph showing the relationship between the loss difference, the incident angle, and the dividing ratio.
Figure 3:
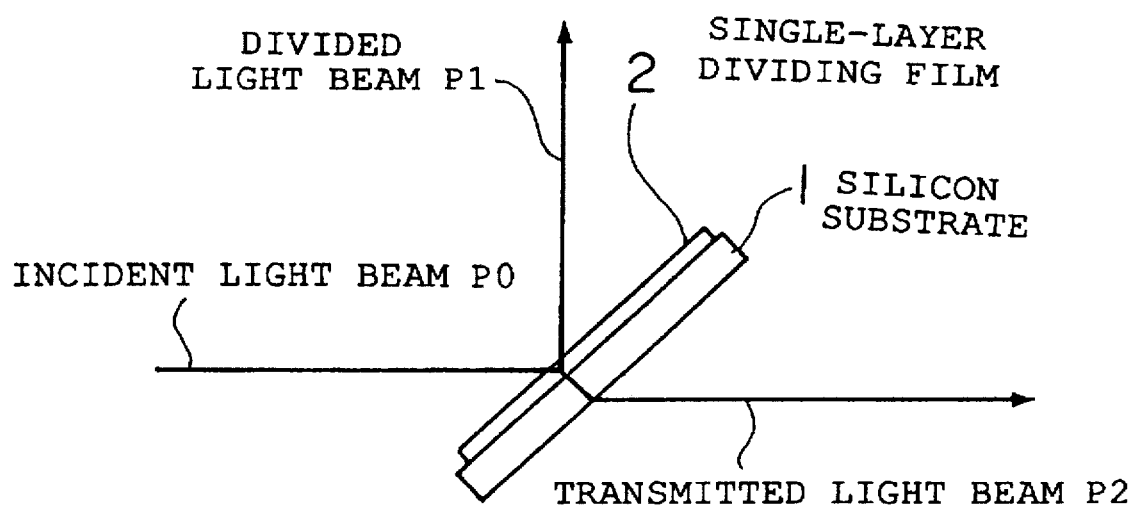
FIG. 3 is a view showing the principles and arrangement of an optical coupler according to a first embodiment of the present invention.

FIG. 3 shows the principles and arrangement of an optical coupler according to the first embodiment of the present invention. In FIG. 3, a single-layer dividing film 2 is formed on a substrate 1. The substrate 1 is made of a single crystal of Si having a refractive index of 3.50 rather than optical glass having a refractive index of 1.50. The single-layer dividing film 2 is made of a material having a refractive index which is the same as or smaller than the square root (about 1.87) of the refractive index (3.50) of the substrate 1, e.g., $SiO_2$ having a refractive index of 1.46. The material is evaporated to a predetermined optical film thickness on the substrate 1. The optical film thickness is defined as $n \cdot D/\lambda 0$ where n is the refractive index of the film, D the thickness of the film, and $\lambda 0$ the employed wavelength in the wavelength band of a signal light.

When a signal light beam P0 is applied to the single-layer dividing film 2 on the substrate 1 at an incident angle of about 45 degrees, the single-layer dividing film 2 reflects a portion P1 of the signal light beam P0 and transmits a remainder P2 of the signal light beam P0 therethrough.

Figure 4:
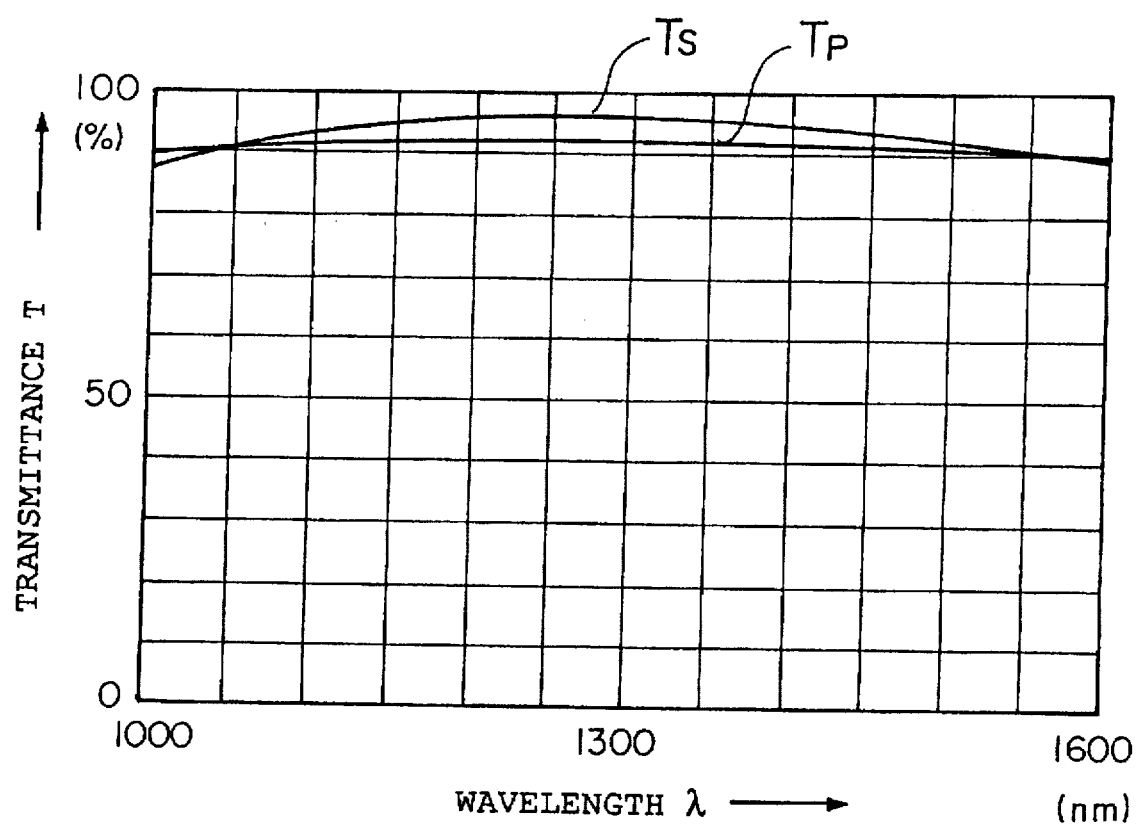
FIG. 4 is a graph showing the transmission characteristics of a dividing film of the optical coupler.

FIG. 4 is a graph showing the transmission characteristics of the dividing film of the optical coupler that is arranged as described above. The horizontal axis of FIG. 4 represents the wavelength $\lambda$ (nm) of the signal light beam and the vertical axis thereof represents the transmittance T (%). Tp and Ts indicate the transmittances (%) of respective P- and S-polarized light contained in the signal light beam.

In FIG. 4, there are two points where the transmittances T of the P-(Tp) and S-polarized light (Ts) are equal to each other (Tp=Ts). At these two points, the dividing ratio is about 1:10. The present embodiment is based on this feature, i.e., when the light is divided about either one of the above two points, the dividing ratio is substantially free of the influence of the polarization dependency.

The positions of the two points with respect to the wavelength $\lambda$ (nm) of the incident signal light beam can be determined as desired depending on the material and thickness of the dividing film on the substrate. It is therefore possible to form the single-layer dividing film 2 such that the transmittances T of the P- and S-polarized light are equal to each other at a desired wavelength $\lambda$, such as the oscillation wavelength or the like of a laser device (LD) in an optical communication system, for example. Thus, the incident light can be divided at the wavelength in a manner which is subject to minimum polarization dependency.

A practically trouble-free wavelength range for the optical coupler in which the difference between the transmittances T of the P- and S-polarized light is slight and the polarization dependency of the dividing ratio is small is considerably narrow. From a practical standpoint, however, such a narrow wavelength range poses no problem because the oscillation frequencies of laser emitting devices for use in optical communications are distributed in a very narrow wavelength range. Therefore, the present embodiment is effective in applications where the light emitted in the narrow wavelength range from laser emitting devices for use in optical communications is applied and divided.

A specific example of the first embodiment will be described below.

Figure 5:
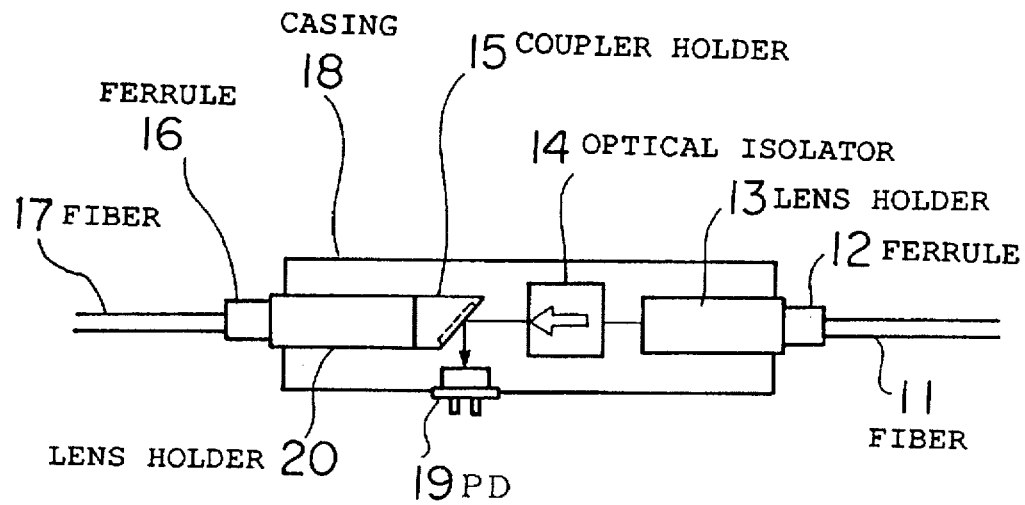
FIG. 5(A) is a view showing an internal structure of an optical coupler.
FIG. 5(B) is an enlarged fragmentary cross-sectional view of the optical coupler shown in FIG. 5(A)
Figure 5:
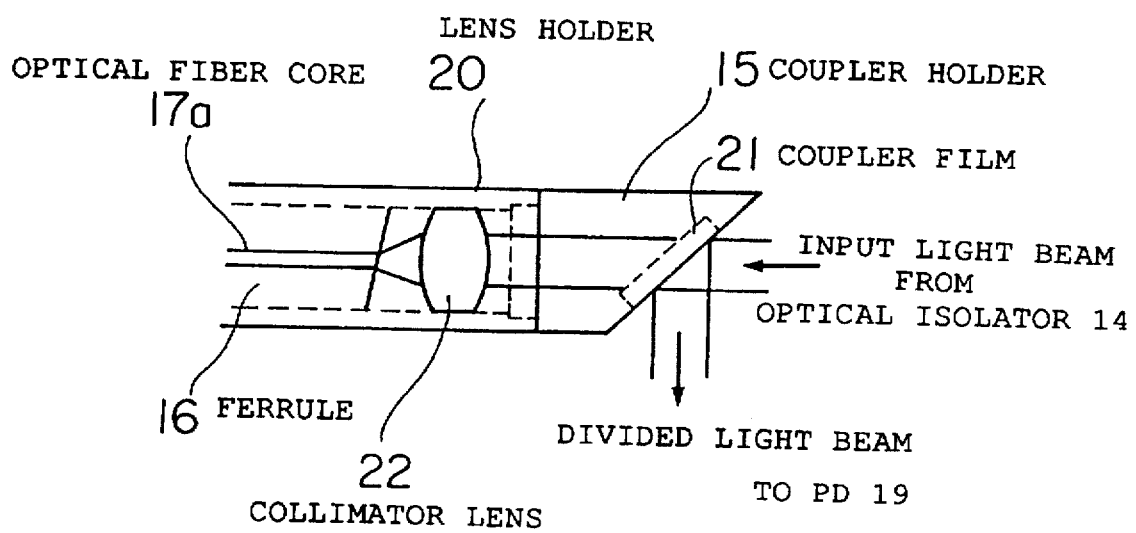

FIG. 5(A) is a view showing an internal structure of an optical coupler. In FIG. 5(A), the optical coupler includes optical fibers 11, 17 for transmitting a signal light beam, ferrules 12, 16 attached to the optical fibers 11, 17, respectively, lens holders 13, 20 housing collimator lenses (described later on), etc. therein, an optical isolator 14 for preventing a portion of the signal light reflected by an end surface of a lens or the like from returning into the optical fiber 11, a coupler holder 15 housing a coupler film (described later on), a casing 18 housing various components, and a photodiode (PD) 19 for converting incident light into an electric signal. The signal light beam is inputted from the right-hand optical fiber 11 and outputted through the left-hand optical fiber 17.

FIG. 5(B) is an enlarged fragmentary cross-sectional view of the optical coupler shown in FIG. 5(A). Those parts shown in FIG. 5(B) which are denoted by reference numerals identical to those shown in FIG. 5(A) are identical in structure to those shown in FIG. 5(A). In FIG. 5(B), a coupler film 21 is evaporated as a single-layer film of $SiO_2$ on an Si substrate. A collimator lens 22 is housed in the lens holder 20. The optical fiber 17 has an optical fiber core 17a which is exposed where cladding is removed and is fixed to the ferrule 16.

Specifically, the coupler film 21 is formed by evaporating a single layer of $SiO_2$ to a thickness of 0.238 (μm) on a surface of the Si substrate. The opposite surface of the substrate is coated with an antireflection film (AR film).

The coupler film 21 is secured to the coupler holder 15 such that an input signal light beam from the optical fiber 11 is applied at an incident angle of 45 degrees to the coupler film 21. The collimator lens 22 and the ferrule 16 are fixed to the lens holder 20 such that the input signal light beam is applied to an end surface of the optical fiber core 17a at its center. The coupler holder 15 and the lens holder 20 are shaped so as to engage each other. The coupler film 21 is fixed in position at the angle of 45 degrees when the coupler holder 15 and the lens holder 20 engage each other.

In this embodiment, the single-layer film of $SiO_2$ on the surface of the coupler film 21 has a film thickness D that is determined to be 0.238 (μm) such that the optical film thickness ($n \cdot D/\lambda 0$) is 0.23 based on the refractive index n (=1.46) of $SiO_2$ and the employed wavelength $\lambda 0$ in the wavelength band of a signal light (=1.55 ($\lambda$m)).

When a signal light beam P0 is applied to the coupler film 21, a portion of the signal light beam P0 is reflected as a divided light beam P1 by the coupler film 21 and a remainder of the signal light beam P0 is transmitted as a transmitted light beam P2 therethrough. The divided light beam P1 is then applied to a photodetector surface of the PD 19 and converted thereby into an electric signal, which is outputted as an output signal for use in monitoring the intensity of the signal light beam. The transmitted light beam P2 is applied through the collimator lens 22 in the lens holder 20 to the end surface of the optical fiber core 17a, and then transmitted through the optical fiber 17.

Figure 6:
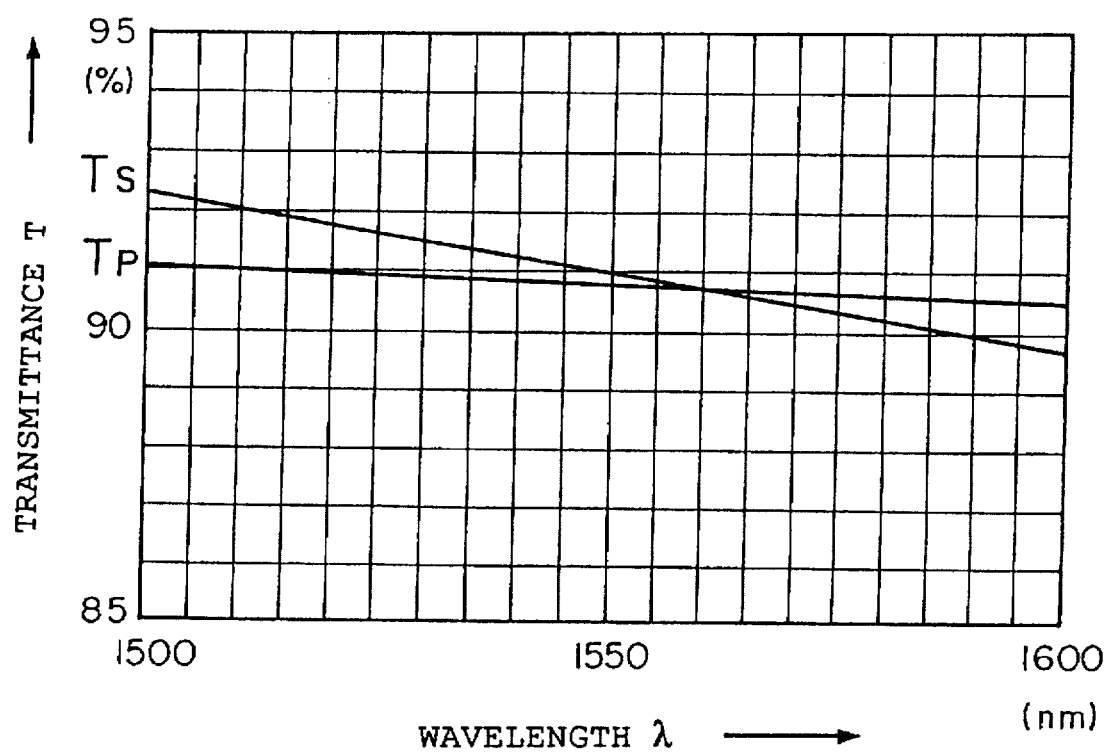
FIG. 6 is a graph showing the transmission characteristics of the optical coupler shown in FIG. 5(A)

FIG. 6 shows the transmission characteristics of the optical coupler according to the present embodiment. The horizontal axis of FIG. 6 represents the wavelength $\lambda$ (nm) of the signal light beam and the vertical axis thereof represents the transmittance T (%). Tp and Ts indicate the transmittances (%) of respective P- and S-polarized light contained in the signal light beam. For an easier observation, the graph is enlarged to show the transmittance T in a range from 85 (%) to 95 (%).

As shown in FIG. 6, the difference between the transmittances T of the P- and S-polarized light is slight in the vicinity of the wavelength of the signal light beam, i.e., 1550 nm, minimizing the polarization dependency of the dividing ratio to a practically trouble-free level. The optical coupler can have a dividing ratio of 1:10 that is less dependent on the polarization.

The substrate of Si crystal absorbs light in a short wavelength band, but absorbs no light at a wavelength of 1.55 (λm). It is therefore suitable for use in optical communications. Since substrates of Si crystal are mass-produced as semiconductor chip substrates, they are more inexpensive than optical glass substrates. Substrates of Si crystal are also an excellent material as the grinding technology for grinding them is established.

The process of manufacturing the coupler film 21 is simple because it can be manufactured simply by evaporating a single-layer film of $SiO_2$ on a substrate. The coupler film 21 is stable against changes in temperature and humidity and highly intensive light.

In the above embodiment, the thickness D of the single-layer film of $SiO_2$ on the surface of the coupler film 21 is selected such that the optical film thickness is 0.23. However, the thickness D of the single-layer film of $SiO_2$ may be selected such that the optical film thickness is 0.34.

Figure 7:
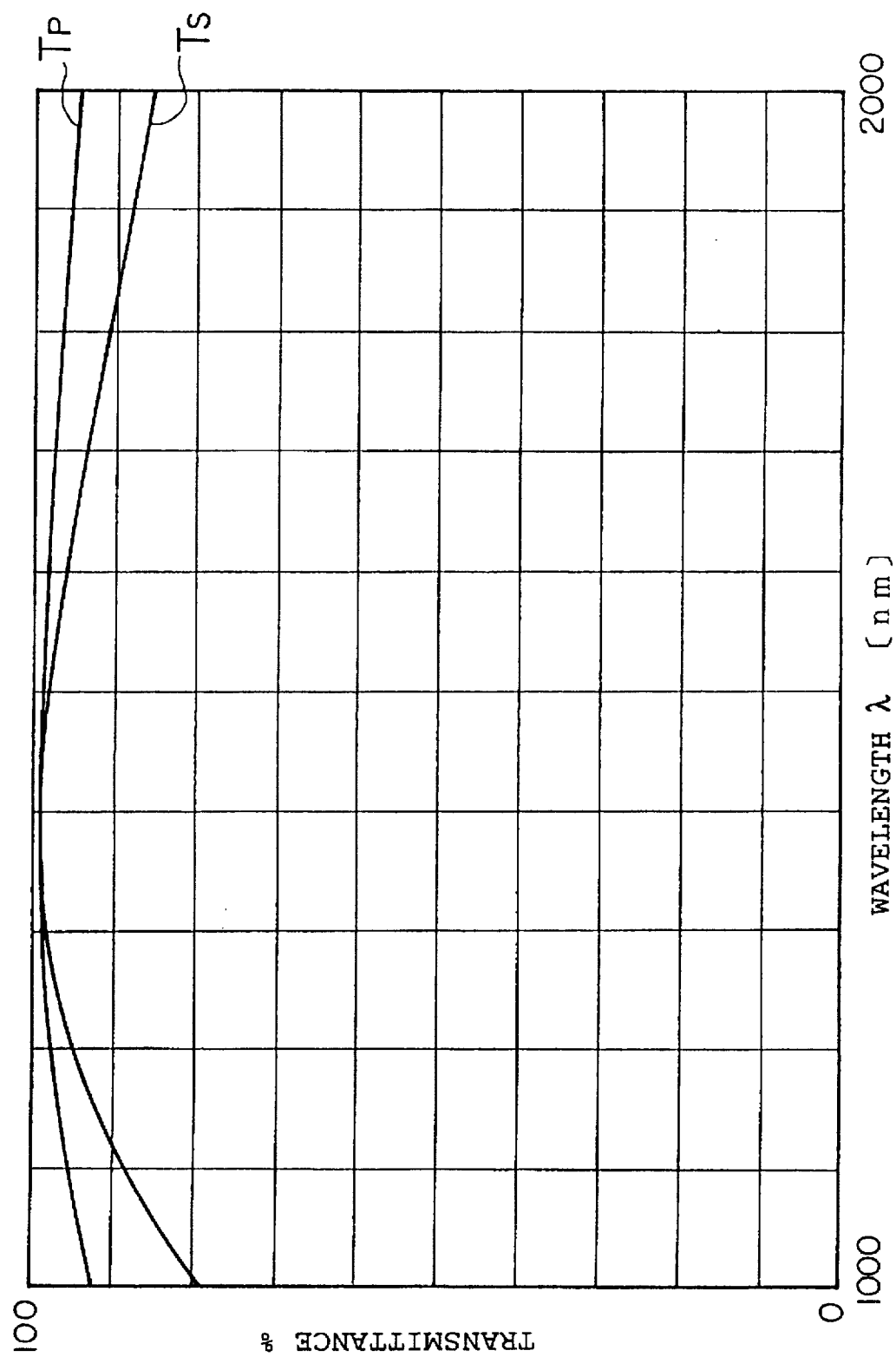
FIG. 7 is a graph showing the transmission characteristics of a dividing film having a dividing ratio of 1:90.
Figure 8:
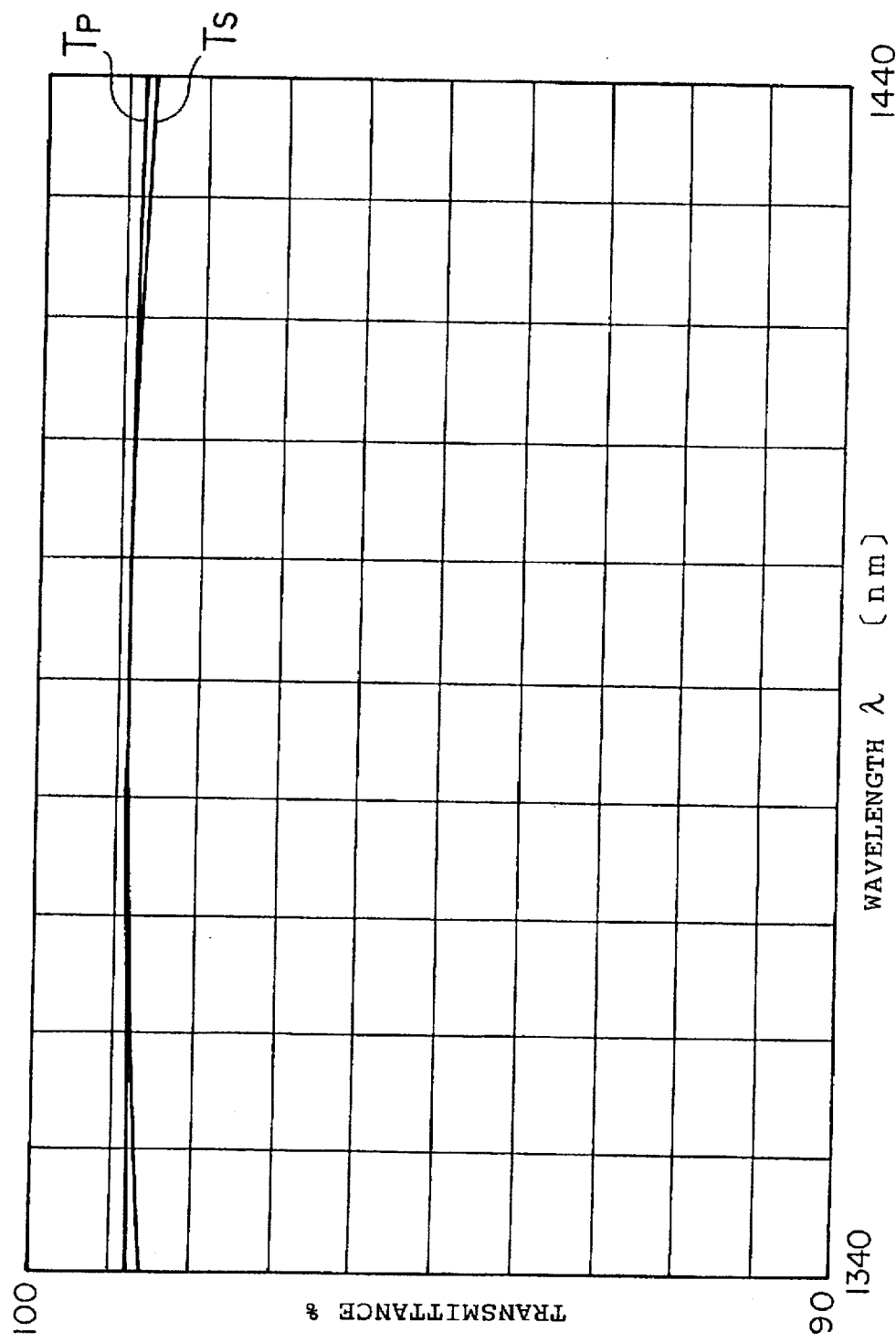
FIG. 8 is a graph showing the transmission characteristics of a dividing film having a dividing ratio of 1:90.

In the above embodiment, the single-layer film evaporated on the surface of the coupler film 21 is formed of $SiO_2$ having a refractive index of 1.46, and the film thickness of the single-layer film is determined based on the fact that the optical film thickness of the single-layer film at the time the difference between the transmittances T of the P- and S-polarized light is very small is 0.23 or 0.34. However, the present invention is not limited to the above single-layer film, and the following single-layer films may be employed:

If a film material having a refractive index of 1.87±0.10 is evaporated to an optical film thickness of 0.25 (λ0=1570 nm) on a silicon substrate having a refractive index of 3.50±0.20, then the transmittance characteristics shown in FIGS. 7 and 8 are obtained. The dividing ratio of this single-layer film is 1:90.

Figure 9:
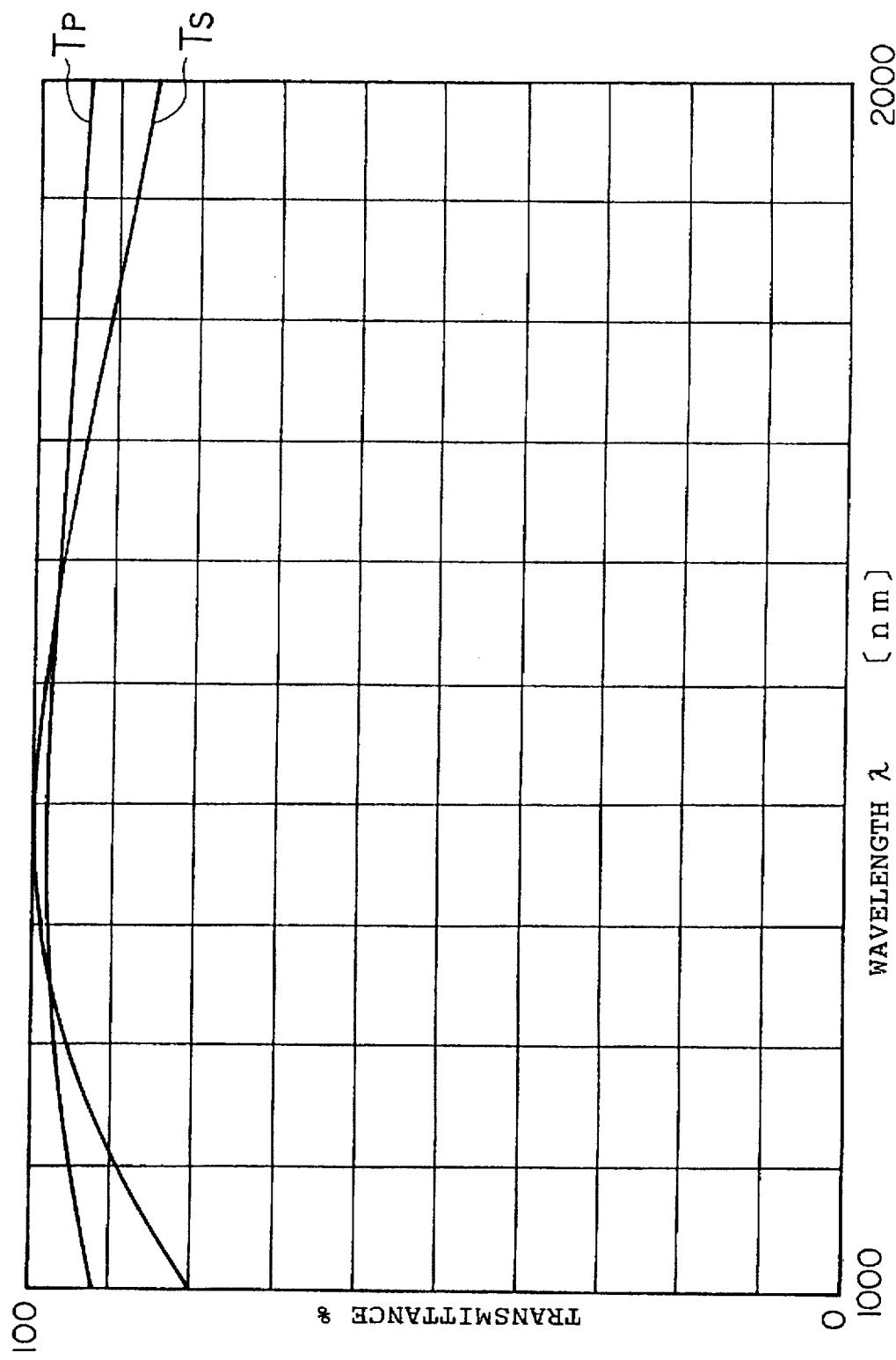
FIG. 9 is a graph showing the transmission characteristics of a dividing film having a dividing ratio of 1:39.
Figure 10:
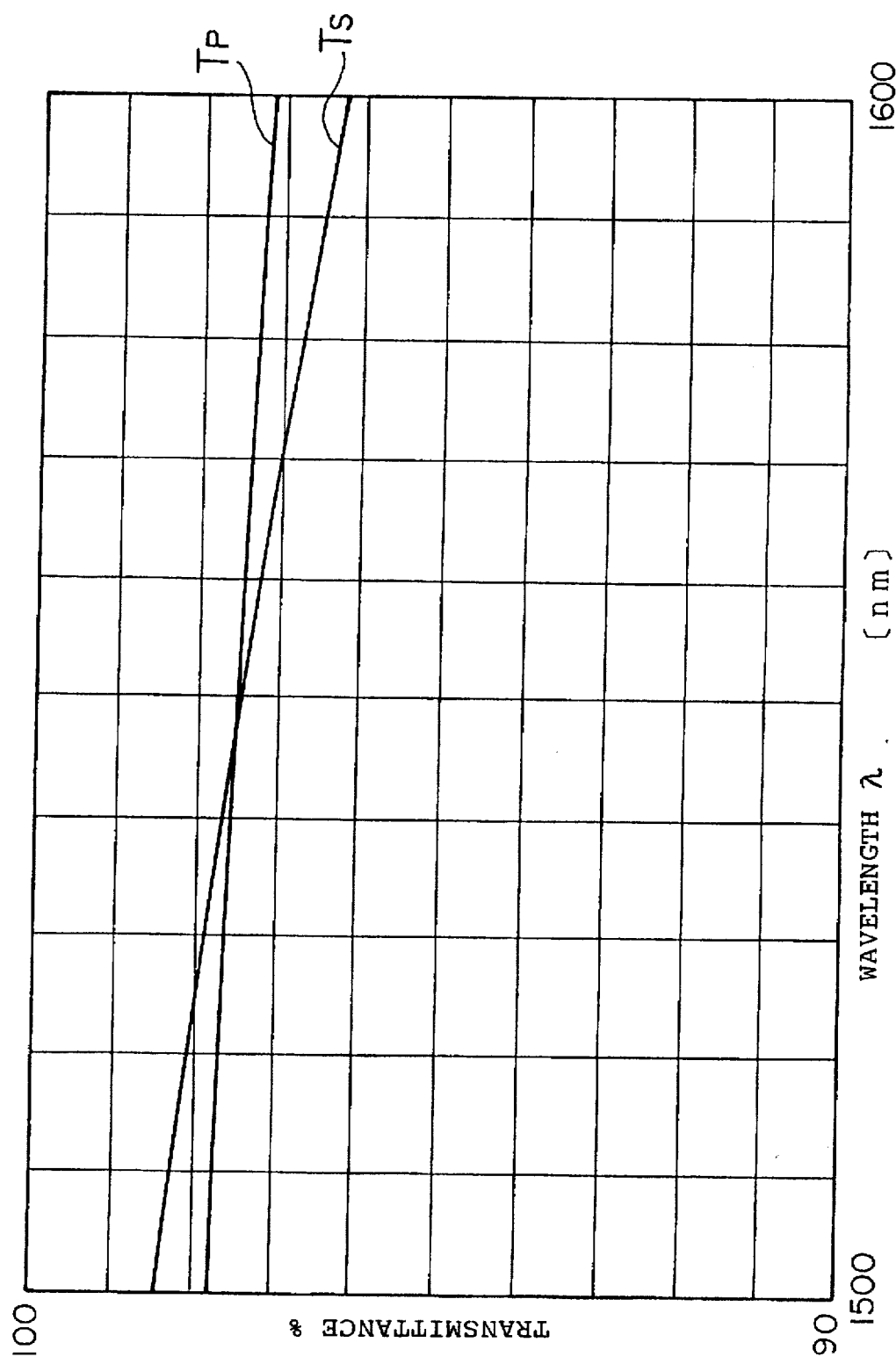
FIG. 10 is a graph showing the transmission characteristics of a dividing film having a dividing ratio of 1:39.

If a film material having a refractive index of 1.80±0.10 is evaporated to an optical film thickness of 0.24 or 0.30 (λ0=1570 nm) on a silicon substrate having a refractive index of 3.50±0.20, then the transmittance characteristics shown in FIGS. 9 and 10 are obtained. The dividing ratio of this single-layer film is 1:39.

Figure 11:
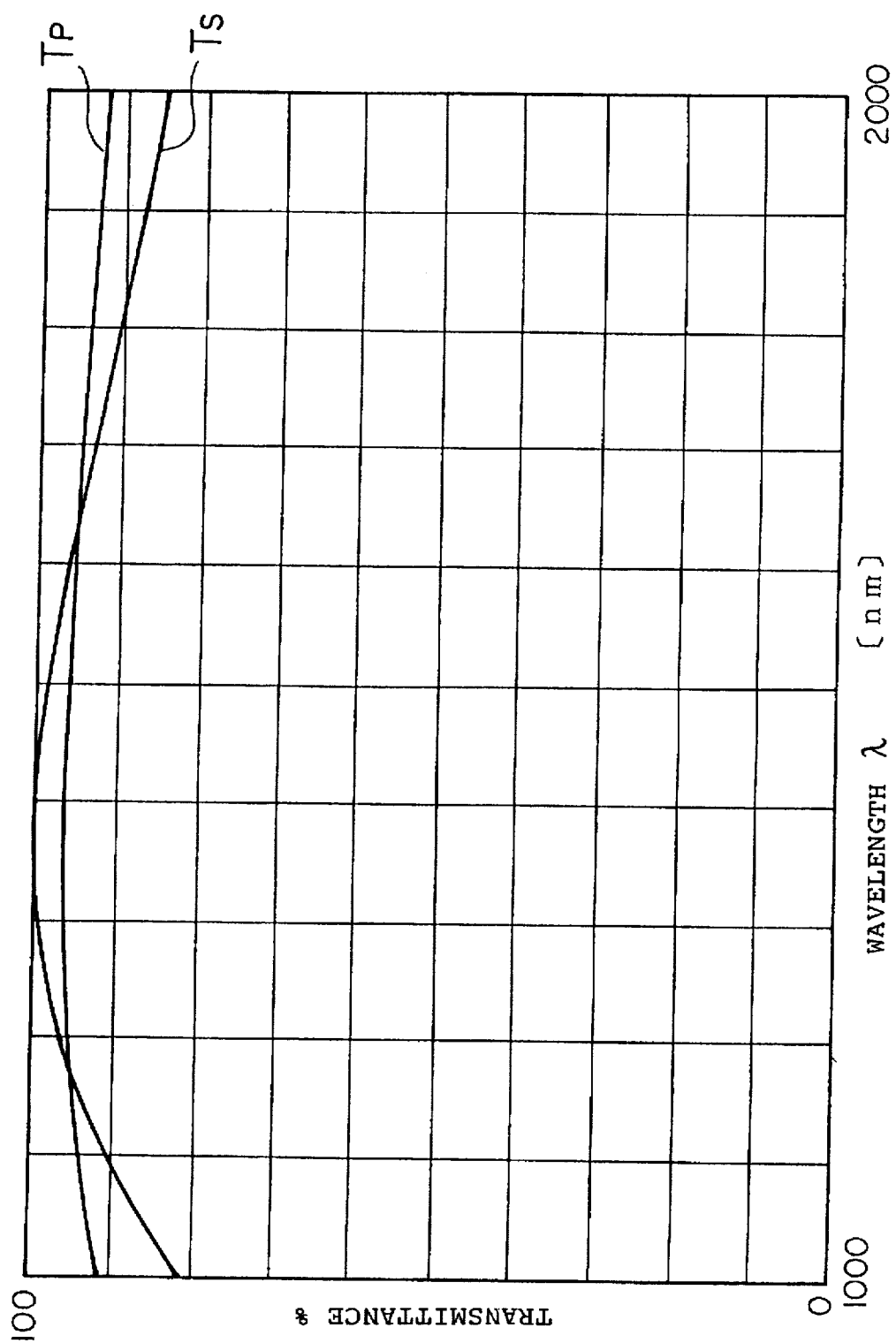
FIG. 11 is a graph showing the transmission characteristics of a dividing film having a dividing ratio of 1:22.
Figure 12:
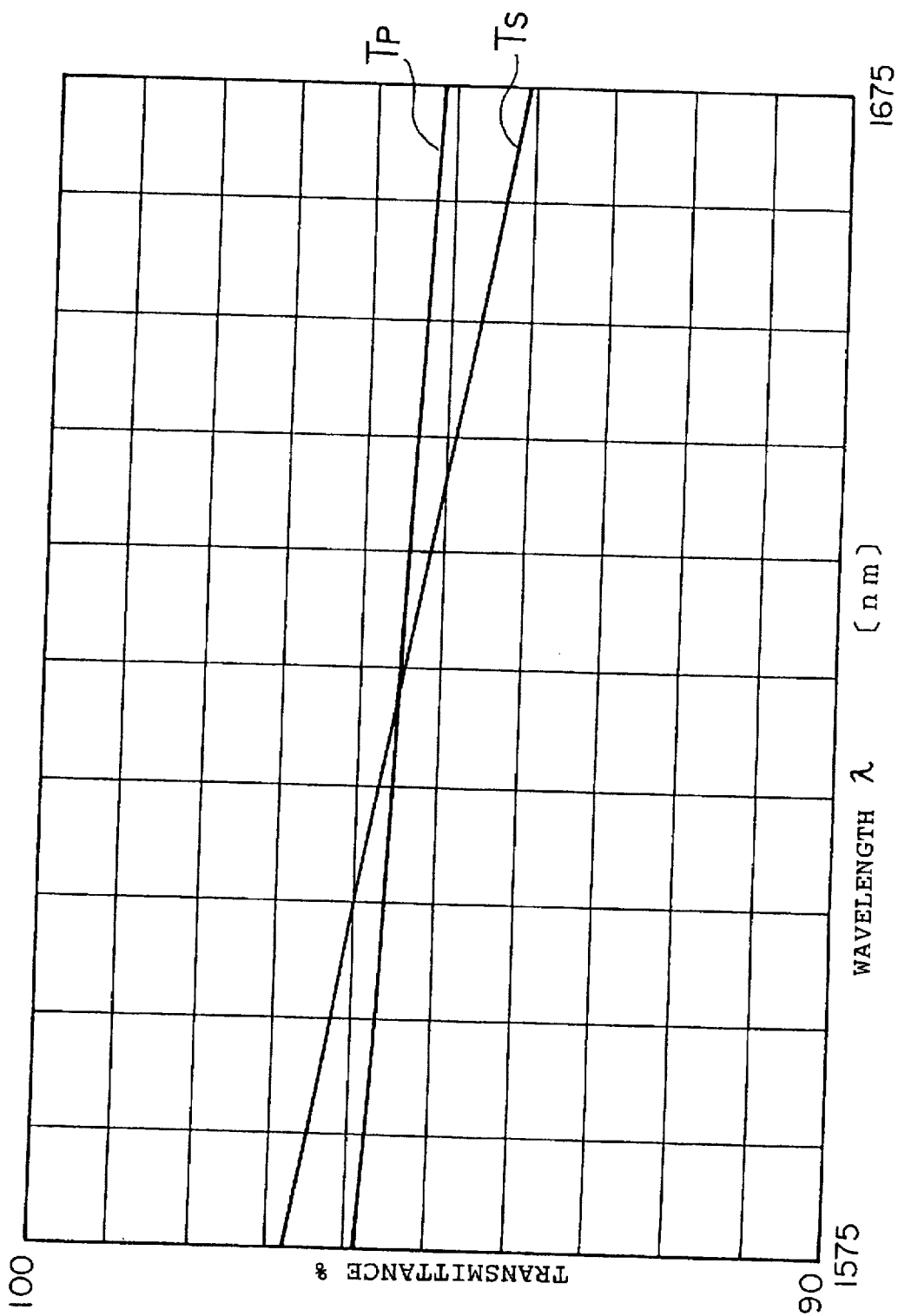
FIG. 12 is a graph showing the transmission characteristics of a dividing film having a dividing ratio of 1:22.

If a film material having a refractive index of 1.70±0.10 is evaporated to an optical film thickness of 0.23 or 0.32 (λ0=1630 nm) on a silicon substrate having a refractive index of 3.50±0.20, then the transmittance characteristics shown in FIGS. 11 and 12 are obtained. The dividing ratio of this single-layer film is 1:22.

Figure 13:
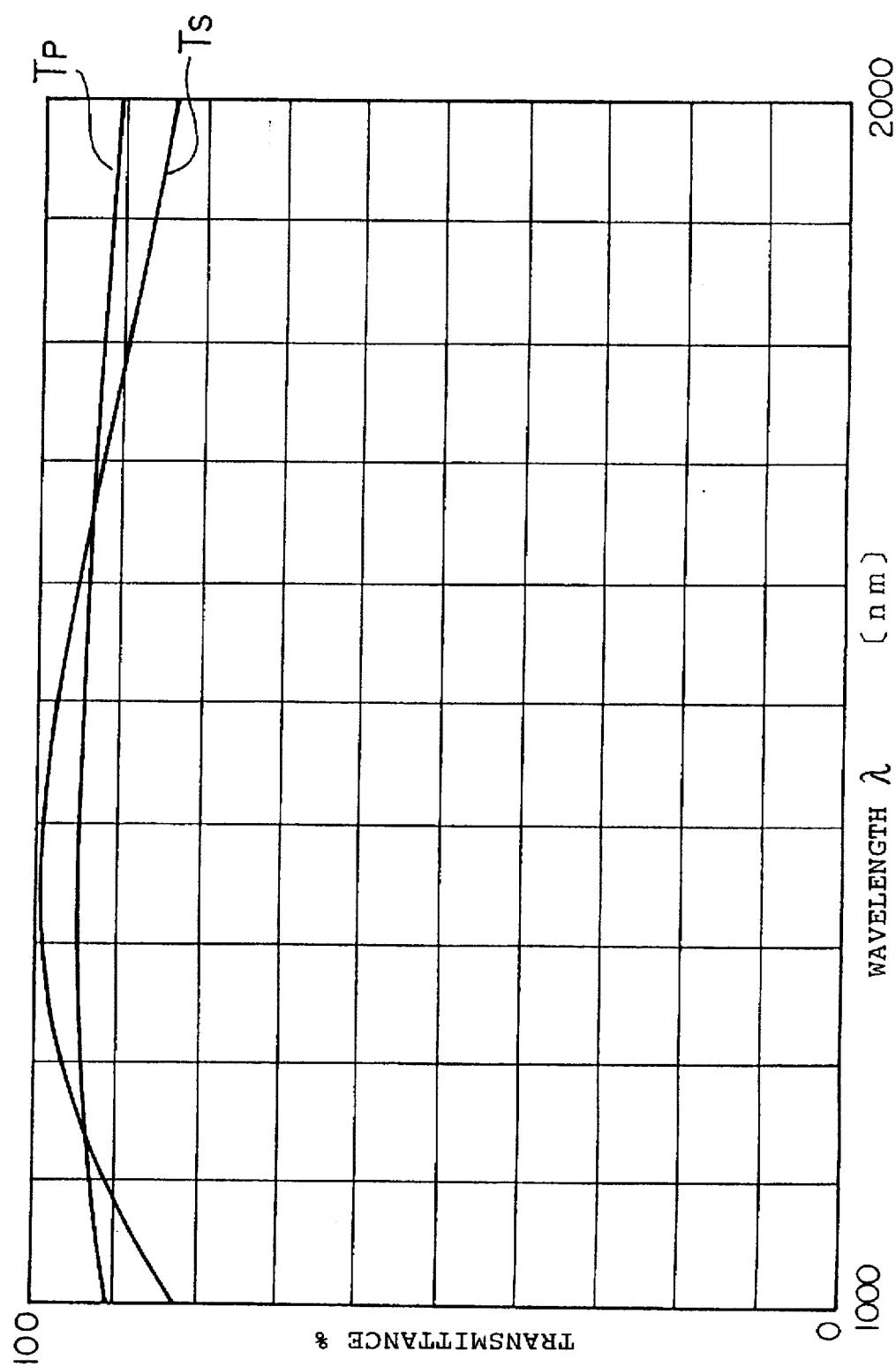
FIG. 13 is a graph showing the transmission characteristics of a dividing film having a dividing ratio of 1:14.
Figure 14:
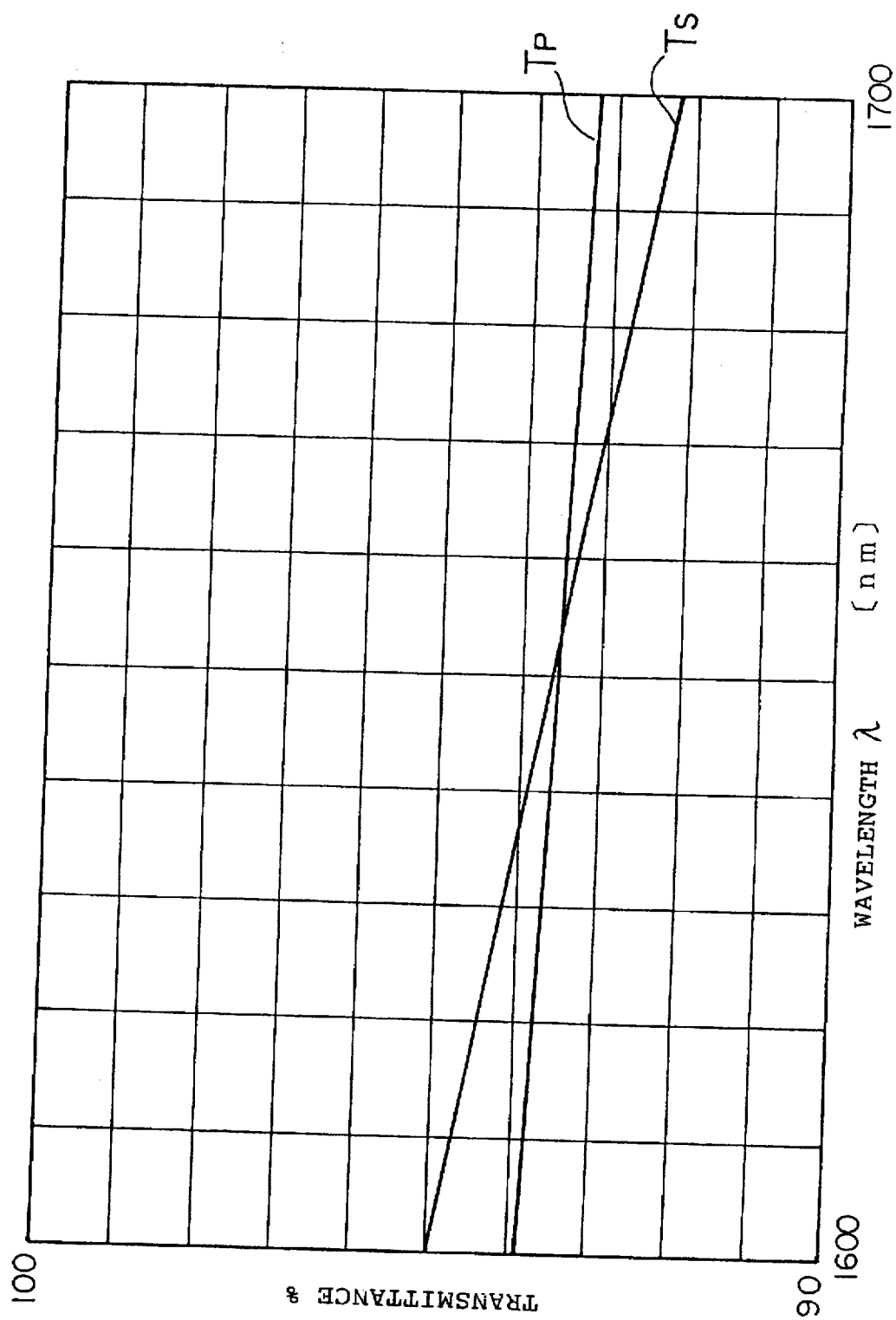
FIG. 14 is a graph showing the transmission characteristics of a dividing film having a dividing ratio of 1:14.

If a film material having a refractive index of 1.60±0.10 is evaporated to an optical film thickness of 0.23 or 0.33 (λ0=1630 nm) on a silicon substrate having a refractive index of 3.50±0.20, then the transmittance characteristics shown in FIGS. 13 and 14 are obtained. The dividing ratio of this single-layer film is 1:14.

The films having the refractive indexes of 1.87±0.10, 1.80±0.10, 1.70±0.10, and 1.60±0.10 may be formed by sputtering a suitable optical glass having a refractive index of about 2.0 as a film material under suitable condition settings including gas concentration, temperature, time, etc.

According to the first embodiment, as described above, the polarization dependency can be substantially eliminated at a desired wavelength even if the incident angle of a signal light beam is 45 degrees, and the dividing film is made of a material that is readily available and can be formed simply. Therefore, the optical coupler is subject to very small polarization dependency, simple in structure, inexpensive to manufacture, and stable in operation.

A second embodiment of the present invention will now be described below.

Figure 15:
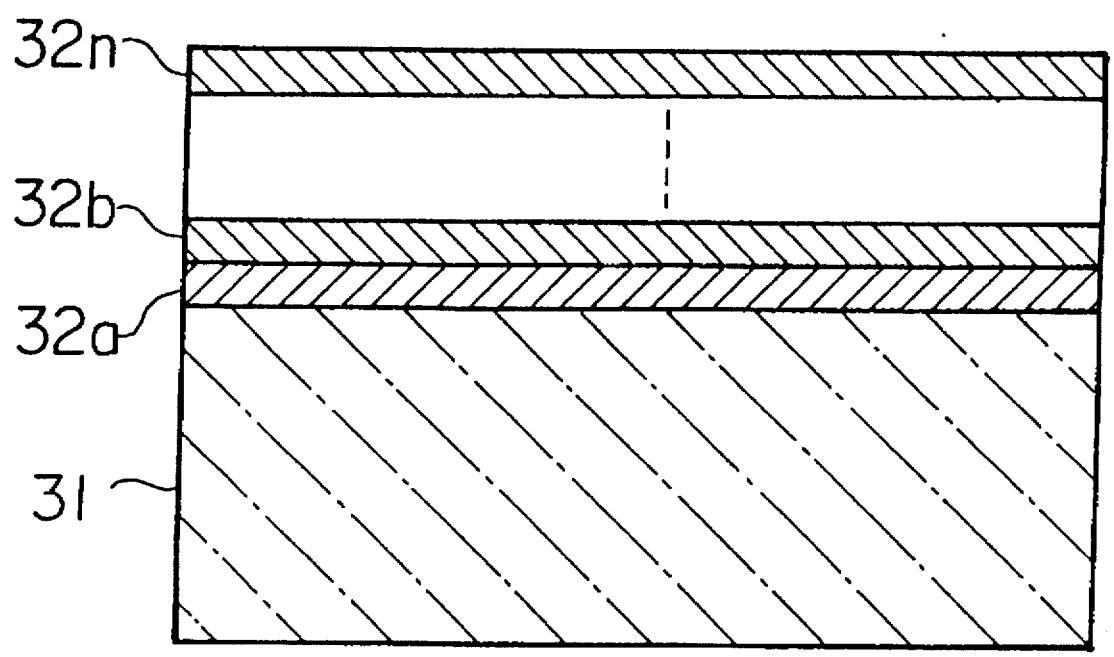
FIG. 15 is a view showing the arrangement of a dividing film according to a second embodiment of the present invention.

FIG. 15 shows the arrangement of a dividing film according to the second embodiment of the present invention. In FIG. 15, a multiplicity of thin-film layers 32a, 32b,~32n are formed on a substrate 31. The substrate 31 is made of ordinary glass (BK-7), silicon (Si), silicon dioxide ($SiO_2$), or any of various optical glass materials. The thin-film layers 32a, 32b,~32n are formed of two or three of $SiO_2$, $TiO_2$, and $Al_2O_3$ to predetermined optical thicknesses, and are provided in a suitable combination of materials and thicknesses. The material of the substrate 31, and the combination of materials and thicknesses of the thin-film layers 32a, 32b, ~32n are selected such that the polarization dependency is reduced depending on the dividing ratio of an incident light beam and the central wave of the band of the incident light beam. The selected results are given as Examples 2.1 to 2.19 below.

In Example 2.1, the substrate 31 shown in FIG. 15 is made of ordinary glass (BK-7) having a refractive index of 1.51±0.10, and a thin film of $SiO_2$ having a refractive index of 1.46±0.10, a thin film of $Al_2O_3$ having a refractive index of 1.65±0.10, and a thin film of $TiO_2$ having a refractive index of 2.30±0.10 are deposited in five layers on the substrate 31 as indicated below. The external medium (air) has a refractive index of 1.0 (this holds true for the other Examples).

The types of the thin films in the first ~ fifth layers are represented by respective refractive indexes n1~n5, and the thin films have respective optical film thicknesses d1~d5 (λ0=1500 nm).

n1=1.46±0.10, d1=0.25~0.40
n2=1.65±0.10, d2=0.10~0.30
n3=1.46±0.10, d3=0.30~0.50
n4=2.30±0.10, d4=0.10~0.25
n5=1.46±0.10, d5=0.30~0.40

The first layer is closest to the substrate 31, and the second through fifth layers are progressively remoter from the substrate 31 (this holds true for the other Examples).

Figure 16:
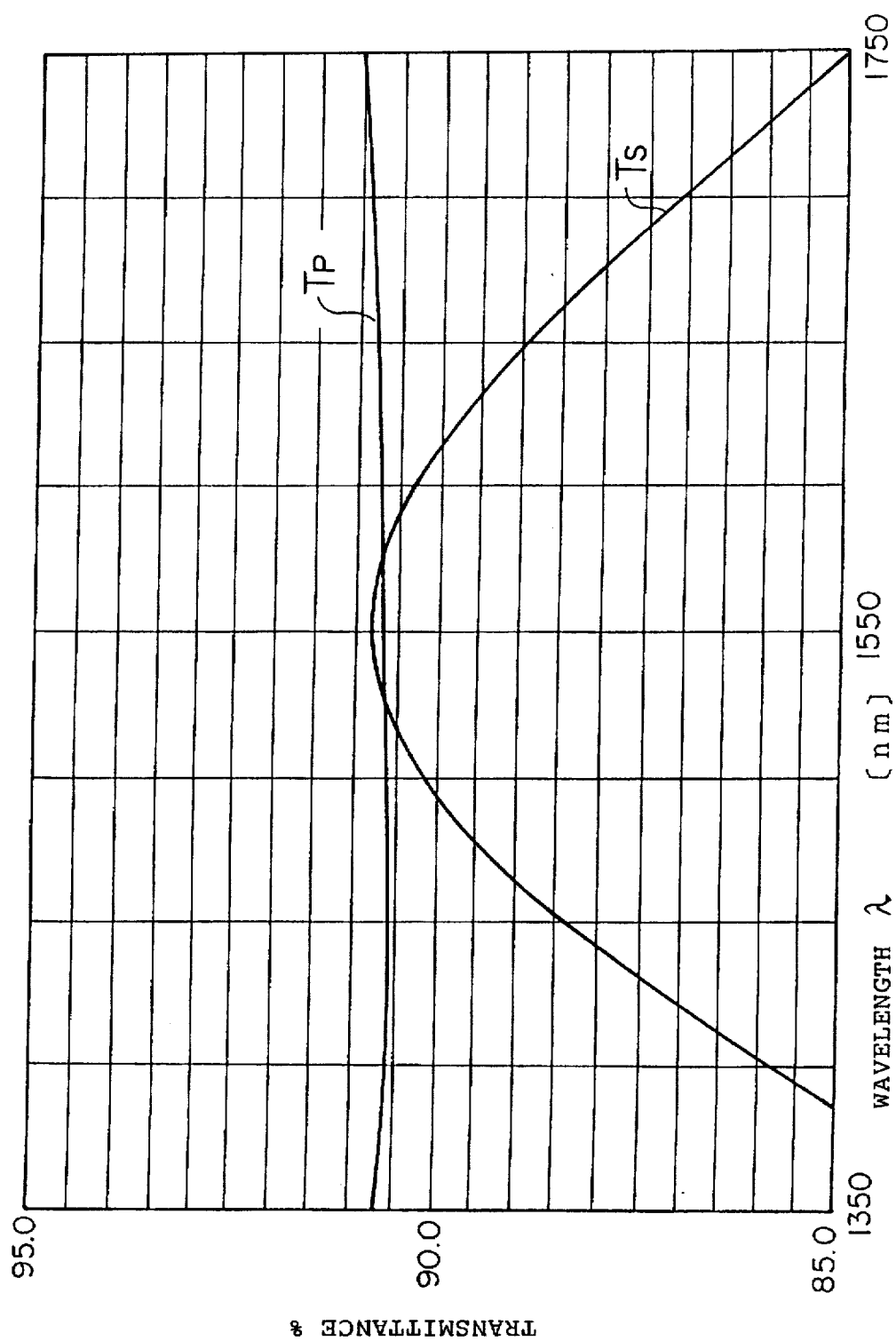
FIG. 16 is a diagram showing characteristic curves of a dividing film according to Example 2.1 of the present invention.

FIG. 16 shows characteristic curves of a dividing film according to Example 2.1. The incident angle is 45 degrees, and the dividing ratio is 1:10. In Example 2.1, the first, third, and fifth layers comprise a thin film of $SiO_2$ and have the same refractive index, the second layer comprises a thin film of $Al_2O_3$, and the fourth layer comprises a thin film of $TiO_2$. At the wavelength λ =1550 nm, the transmittance of the P-polarized light is about 90.7% as can be seen from its transmittance curve Tp, and the transmittance of the S-polarized light is about 90.8% as can be seen from its transmittance curve TS, with the difference therebetween being about 0.1%. The transmittances of the P- and S-polarized light are the same as each other in the vicinity of wavelengths of 1530 nm and 1570 nm. Therefore, the polarization dependency is negligibly small in the vicinity of the wavelength λ =1550 nm.

In Example 2.2, the substrate 31 is made of ordinary glass (BK-7) having a refractive index of 1.51±0.10, and a thin film of $SiO_2$ having a refractive index of 1.46±0.10, a thin film of $Al_2O_3$ having a refractive index of 1.65±0.10, and a thin film of $TiO_2$ having a refractive index of 2.30±0.10 are deposited in five layers on the substrate 31 as indicated below.

The types of the thin films in the first–fifth layers are represented by respective refractive indexes n1–n5, and the thin films have respective optical film thicknesses d1–d5 (λ0=1500 nm).

n1=1.46±0.10, d1=0.30–0.40
n2=2.30±0.10, d2=0.10–0.40
n3=1.65±0.10, d3=0.20–0.40
n4=2.30±0.10, d4=0.10–0.45
n5=1.65±0.10, d5=0.30–0.60

Figure 17:
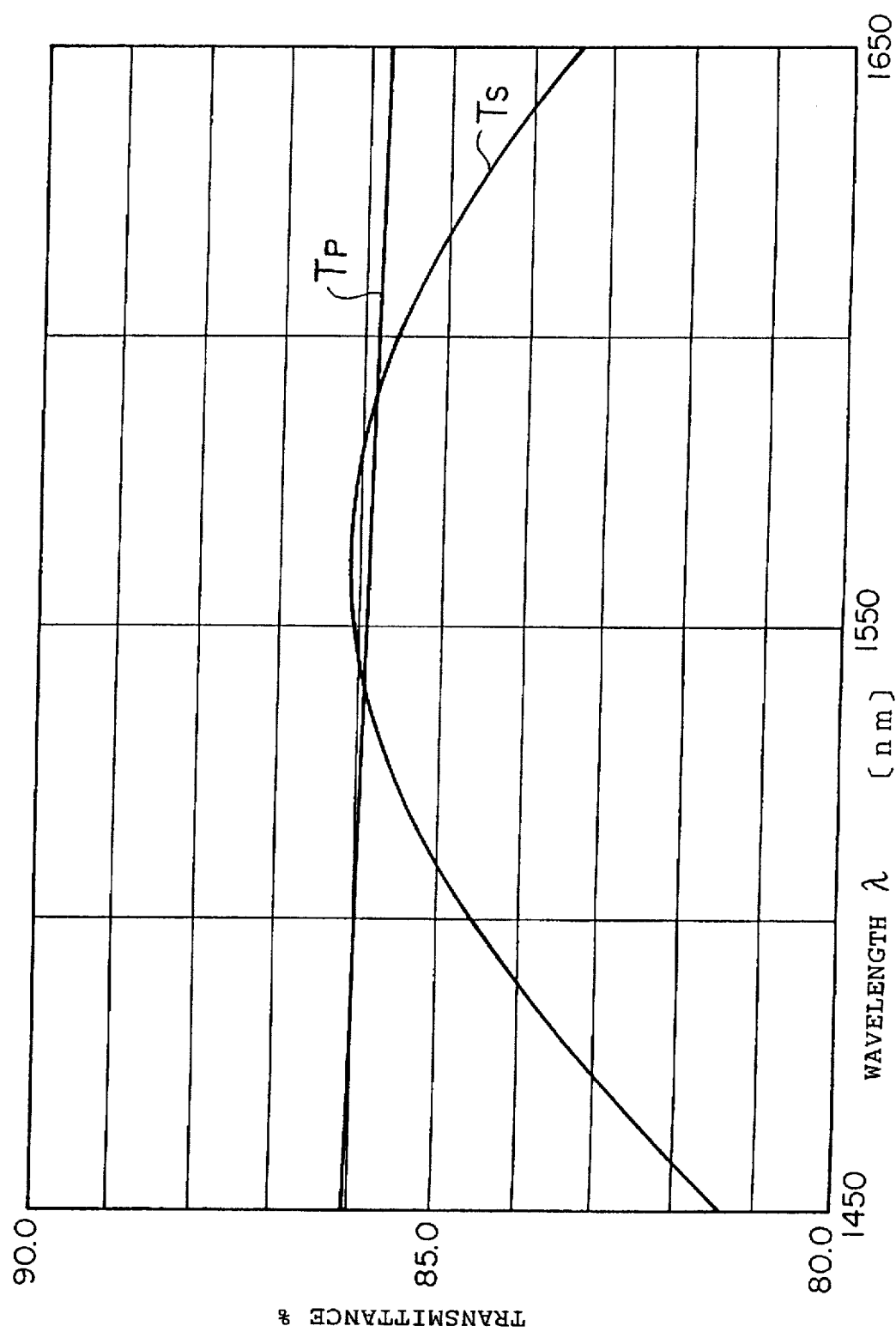
FIG. 17 is a diagram showing characteristic curves of a dividing film according to Example 2.2 of the present invention.

FIG. 17 shows characteristic curves of a dividing film according to Example 2.2. The incident angle is 45 degrees, and the dividing ratio is 1:6. In Example 2.2, the first layer comprises a thin film of $SiO_2$, the second and fourth layers comprise a thin film of $TiO_2$, and the third and fifth layers comprise a thin film of $Al_2O_3$. At the wavelength λ =1570 nm, the transmittance of the P-polarized light is about 86.1% as can be seen from its transmittance curve Tp, and the transmittance of the S-polarized light is about 86.2% as can be seen from its transmittance curve Ts, with the difference therebetween being about 0.1%. The transmittances of the P- and S-polarized light are the same as each other in the vicinity of wavelengths of 1549 nm and 1580 nm. Therefore, the polarization dependency is negligibly small in the vicinity of the wavelength λ =1570 nm.

In Example 2.3, the substrate 31 is made of ordinary glass (BK-7) having a refractive index of 1.51±0.10, and a thin film of $SiO_2$ having a refractive index of 1.46±0.10, a thin film of $Al_2O_3$ having a refractive index of 1.65±0.10, and a thin film of $TiO_2$ having a refractive index of 2.30±0.10 are deposited in five layers on the substrate 31 as indicated below.

The types of the thin films in the first–fifth layers are represented by respective refractive indexes n1–n5, and the thin films have respective optical film thicknesses d1–d5 (λ0=1550 nm).

n1=1.46±0.10, d1=0.10–0.20
n2=2.30±0.10, d2=0.20–0.30
n3=1.65±0.10, d3=0.20–0.30
n4=2.30±0.10, d4=0.20–0.30
n5=1.65±0.10, d5=0.20–0.30

Figure 18:
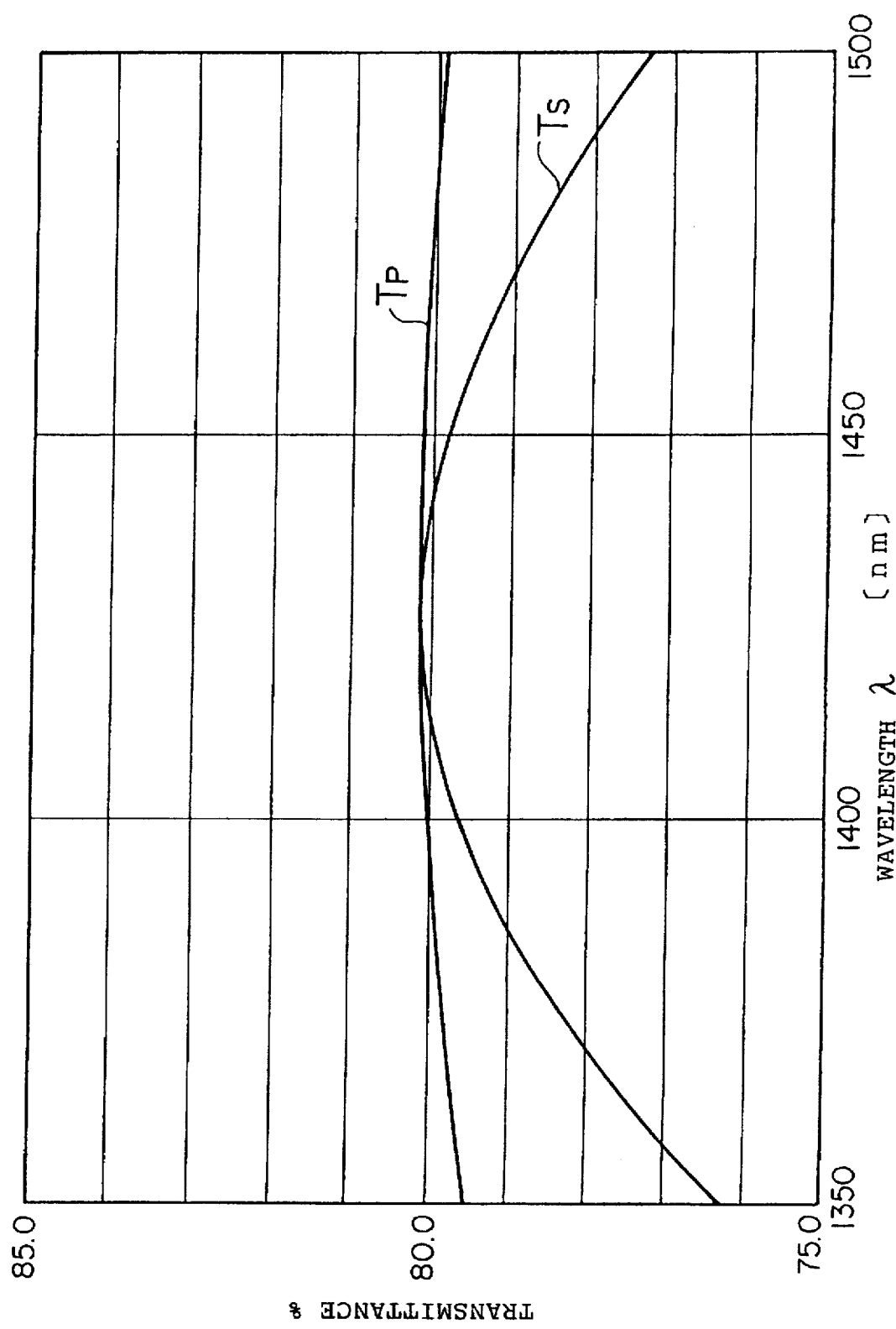
FIG. 18 is a diagram showing characteristic curves of a dividing film according to Example 2.3 of the present invention.

FIG. 18 shows characteristic curves of a dividing film according to Example 2.3. The incident angle is 45 degrees, and the dividing ratio is 1:4. In Example 2.3, as with Example 2.2, the first layer comprises a thin film of $SiO_2$, the second and fourth layers comprise a thin film of $TiO_2$, and the third and fifth layers comprise a thin film of $Al_2O_3$. However, the optical film thicknesses of the layers are different from those of Example 2.2. At the wavelength λ =1425 nm, the transmittances of the P- and S-polarized light are the same as each other, i.e., 80.1%. Therefore, the polarization dependency is negligibly small in the vicinity of the wavelength λ=1425 nm.

In Example 2.4, the substrate 31 is made of ordinary glass (BK-7) having a refractive index of 1.51±0.10, and a thin film of $SiO_2$ having a refractive index of 1.46±0.10, a thin film of $Al_2O_3$ having a refractive index of 1.65±0.10, and a thin film of $TiO_2$ having a refractive index of 2.30±0.10 are deposited in seven layers on the substrate 31 as indicated below.

The types of the thin films in the first–seventh layers are represented by respective refractive indexes n1–n7, and the thin films have respective optical film thicknesses d1–d7.

n1=1.65±0.10, d1=0.20–0.40
n2=1.46±0.10, d2=0.10–0.30
n3=2.30±0.10, d3=0.01–0.20
n4=1.65±0.10, d4=0.10–0.30
n5=1.46±0.10, d5=0.20–0.40
n6=1.65±0.10, d6=0.20–0.40
n7=1.46±0.10, d7=0.15–0.35

There is thus obtained a dividing film whose polarization dependency is negligible and has a dividing ratio of 1:20.

In Example 2.5, the substrate 31 is made of ordinary glass (BK-7) having a refractive index of 1.51±0.10, and a thin film of $SiO_2$ having a refractive index of 1.46±0.10, a thin film of $Al_2O_3$ having a refractive index of 1.65±0.10, and a thin film of $TiO_2$ having a refractive index of 2.30±0.10 are deposited in five layers on the substrate 31 as indicated below.

The types of the thin films in the first–fifth layers are represented by respective refractive indexes n1–d5, and the thin films have respective optical film thicknesses d1–d5.

n1=1.46±0.10, d1=0.70–0.90
n2=1.65±0.10, d2=0.35–0.55
n3=1.46±0.10, d3=0.35–0.55
n4=2.30±0.10, d4=0.10–0.30
n5=1.46±0.10, d5=0.20–0.40

There is thus obtained a dividing film whose polarization dependency is negligible and has a dividing ratio of 1:20.

In Example 2.6, the substrate 31 is made of silicon (Si) having a refractive index of 3.50±0.20, and a thin film of $SiO_2$ having a refractive index of 1.46±0.10, a thin film of $Al_2O_3$ having a refractive index of 1.65±0.10, and a thin film of $TiO_2$ having a refractive index of 2.30±0.10 are deposited in four layers on the substrate 31 as indicated below.

The types of the thin films in the first–fourth layers are represented by respective refractive indexes n1–n4, and the thin films have respective optical film thicknesses d1–d4 (λ0=1270 nm).

n1=1.46±0.10, d1=0.25–0.35
n2=1.65±0.10, d2=0.20–0.30
n3=2.30±0.10, d3=0.05–0.15
n4=1.46±0.10, d4=0.35–0.45

Figure 19:
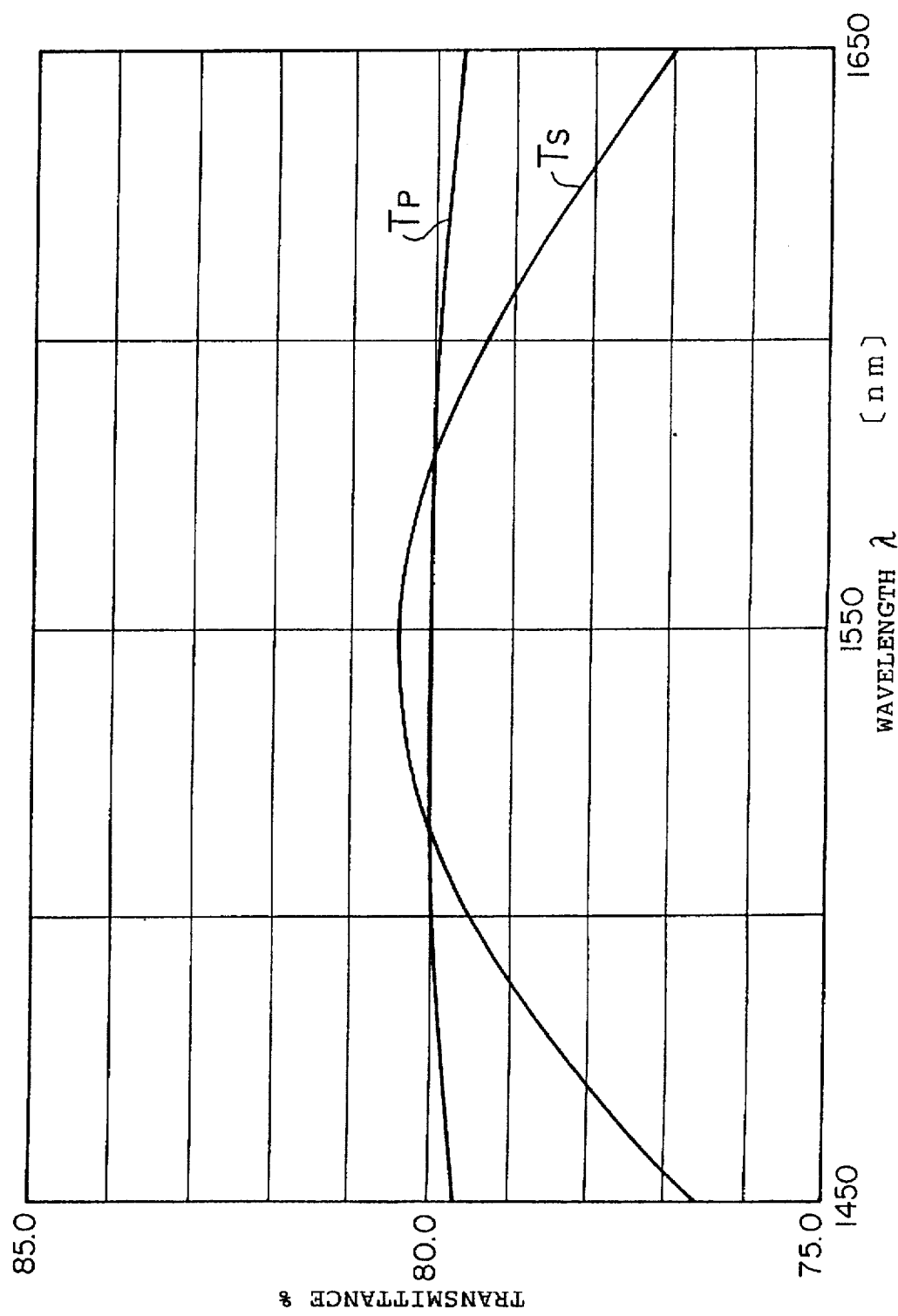
FIG. 19 is a diagram showing characteristic curves of a dividing film according to Example 2.6 of the present invention.

FIG. 19 shows characteristic curves of a dividing film according to Example 2.6. The incident angle is 45 degrees, and the dividing ratio is 1:4. In Example 2.6, the first and fourth layers comprise a thin film of $SiO_2$, the second layer comprises a thin film of $Al_2O_3$ and the third layer comprises a thin film of $TiO_2$. At the wavelength λ=1550 nm, the transmittances of the P- and S-polarized light are about 80.0% and 80.3%, respectively, as can be seen from their transmittance curves Tp, Ts, with the difference therebetween being about 0.3%. Therefore, the polarization dependency is negligibly small in the vicinity of the wavelength λ=1550 nm.

In Example 2.7, the substrate 31 is made of silicon (Si) having a refractive index of 3.50±0.20, and a thin film of $SiO_2$ having a refractive index of 1.46±0.10, a thin film of $Al_2O_3$ having a refractive index of 1.65±0.10, and a thin film of $TiO_2$ having a refractive index of 2.30±0.10 are deposited in four layers on the substrate 31 as indicated below.

The types of the thin films in the first–fourth layers are represented by respective refractive indexes n1–n4, and the thin films have respective optical film thicknesses d1–d4 (λ0=1530 nm).

n1=1.46±0.10, d1=0.01–0.05
n2=1.65±0.10, d2=0.20–0.30
n3=2.30±0.10, d3=0.20–0.30 n4=1.46±0.10, d4=0.25~0.35

Figure 20:
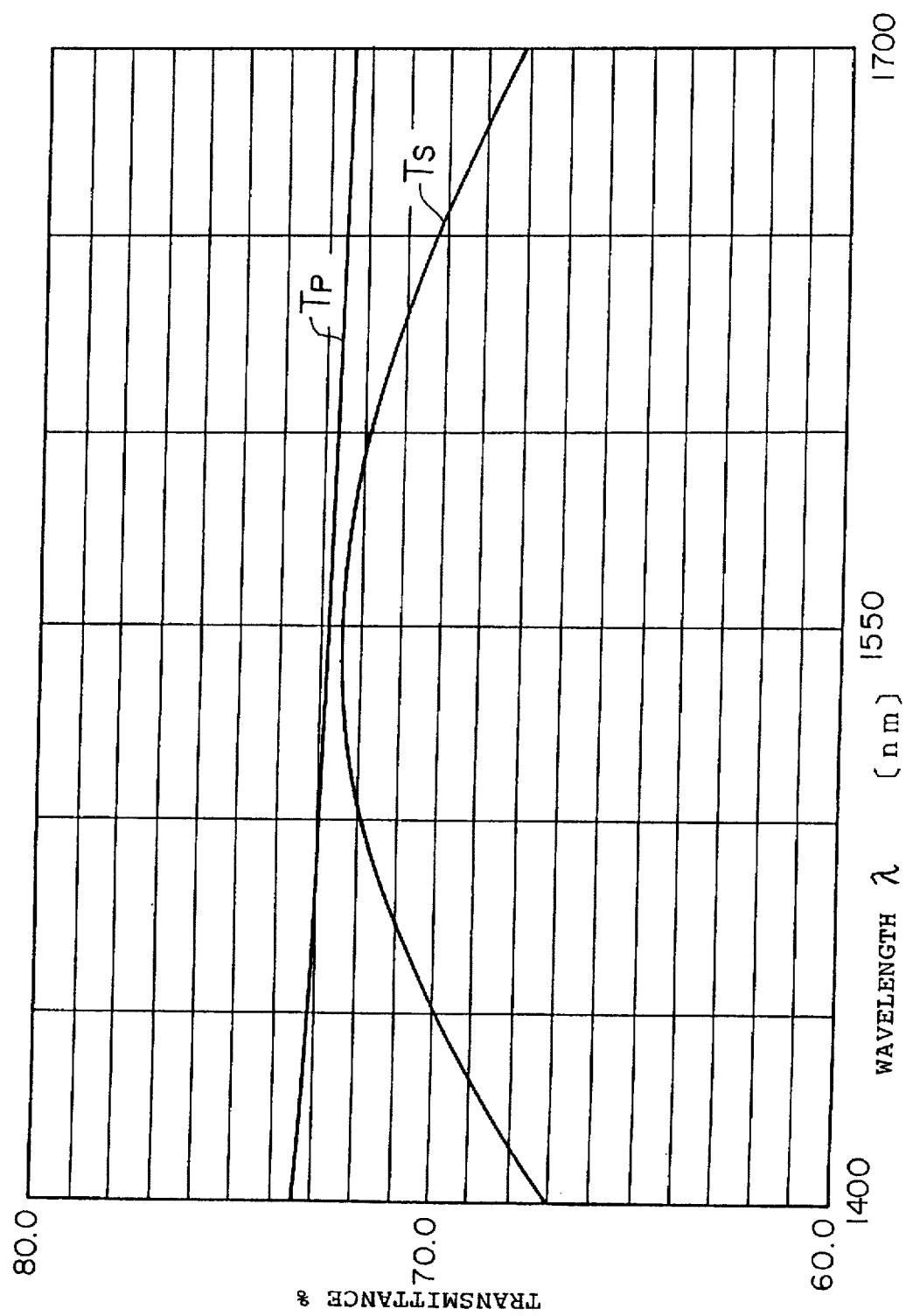
FIG. 20 is a diagram showing characteristic curves of a dividing film according to Example 2.7 of the present invention.

FIG. 20 shows characteristic curves of a dividing film according to Example 2.7. The incident angle is 45 degrees, and the dividing ratio is 1:2.7. In Example 2.7, as with Example 2.6, the first and fourth layers comprise a thin film of $SiO_2$, the second layer comprises a thin film of $Al_2O_3$, and the third layer comprises a thin film of $TiO_2$. However, the optical film thicknesses of the layers are different from those of Example 2.6. At the wavelength λ=1550 nm, the transmittances of the P- and S-polarized light are about 72.8% and 72.5%, respectively, with the difference therebetween being about 0.3%. Therefore, the polarization dependency is negligibly small in the vicinity of the wavelength λ=1550 nm.

In Example 2.8, the substrate 31 is made of silicon (Si) having a refractive index of 3.50±0.20, and a thin film of $SiO_2$ having a refractive index of 1.46±0.10 and a thin film of $TiO_2$ having a refractive index of 2.30±0.10 are deposited in four layers on the substrate 31 as indicated below.

The types of the thin films in the first~fourth layers are represented by respective refractive indexes n1~n4, and the thin films have respective optical film thicknesses d1~d4 (λ0=1800 nm).

n1=2.30±0.10, d1=0.10~0.30
n2=1.46±0.10, d2=0.15~0.35
n3=2.30±0.10, d3=0.15~0.35
n4=1.46±0.10, d4=0.10~0.30

In Example 2.8, the optical film thickness is defined as 4n·D/λ0 where n is the refractive index of the thin film, D the thickness of the film, and λ0 the employed wavelength in the wavelength bank of a signal light.

Figure 21:
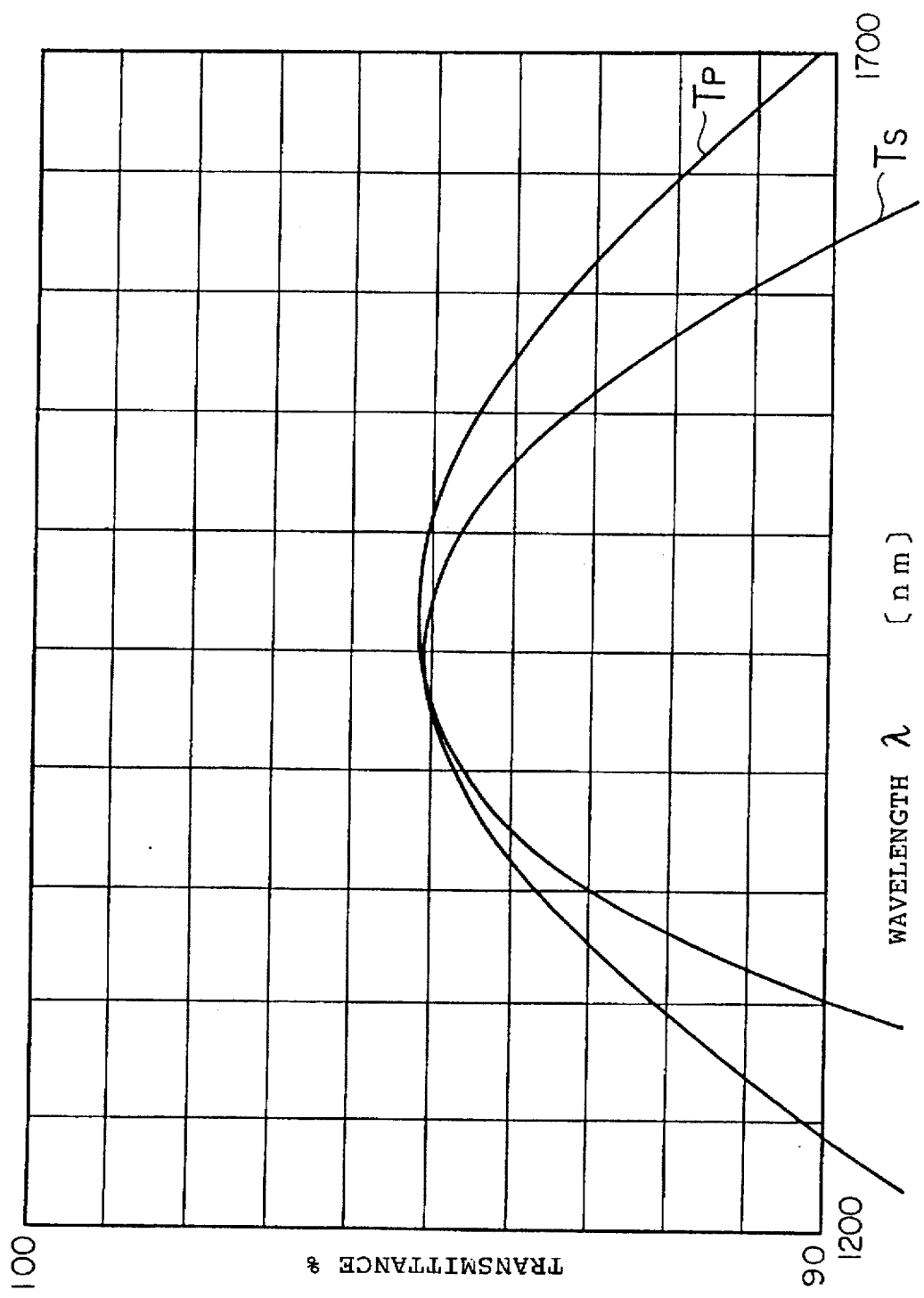
FIG. 21 is a diagram showing characteristic curves of a dividing film according to Example 2.8 of the present invention.

FIG. 21 shows characteristic curves of a dividing film according to Example 2.8. The incident angle is 45 degrees, and the dividing ratio is 1:19. Study of FIG. 21 shows that the polarization dependency is negligibly small in the vicinity of the wavelength λ=1430 nm.

In Example 2.9, the substrate 31 is made of silicon (Si) having a refractive index of 3.50±0.20, and a thin film of $SiO_2$ having a refractive index of 1.46±0.10 and a thin film of $TiO_2$ having a refractive index of 2.30±0.10 are deposited in six layers on the substrate 31 as indicated below.

The types of the thin films in the first~sixth layers are represented by respective refractive indexes n1~n6, and the thin films have respective optical film thicknesses d1~d6 (λ0=1550 nm).

n1=2.30±0.10, d1=0.20~0.40
n2=1.46±0.10, d2=0.01~0.20
n3=2.30±0.10, d3=0.60~0.80
n4=1.46±0.10, d4=0.01~0.20
n5=2.30±0.10, d5=0.20~0.40
n6=1.46±0.10, d6=0.15~0.35

Figure 22:
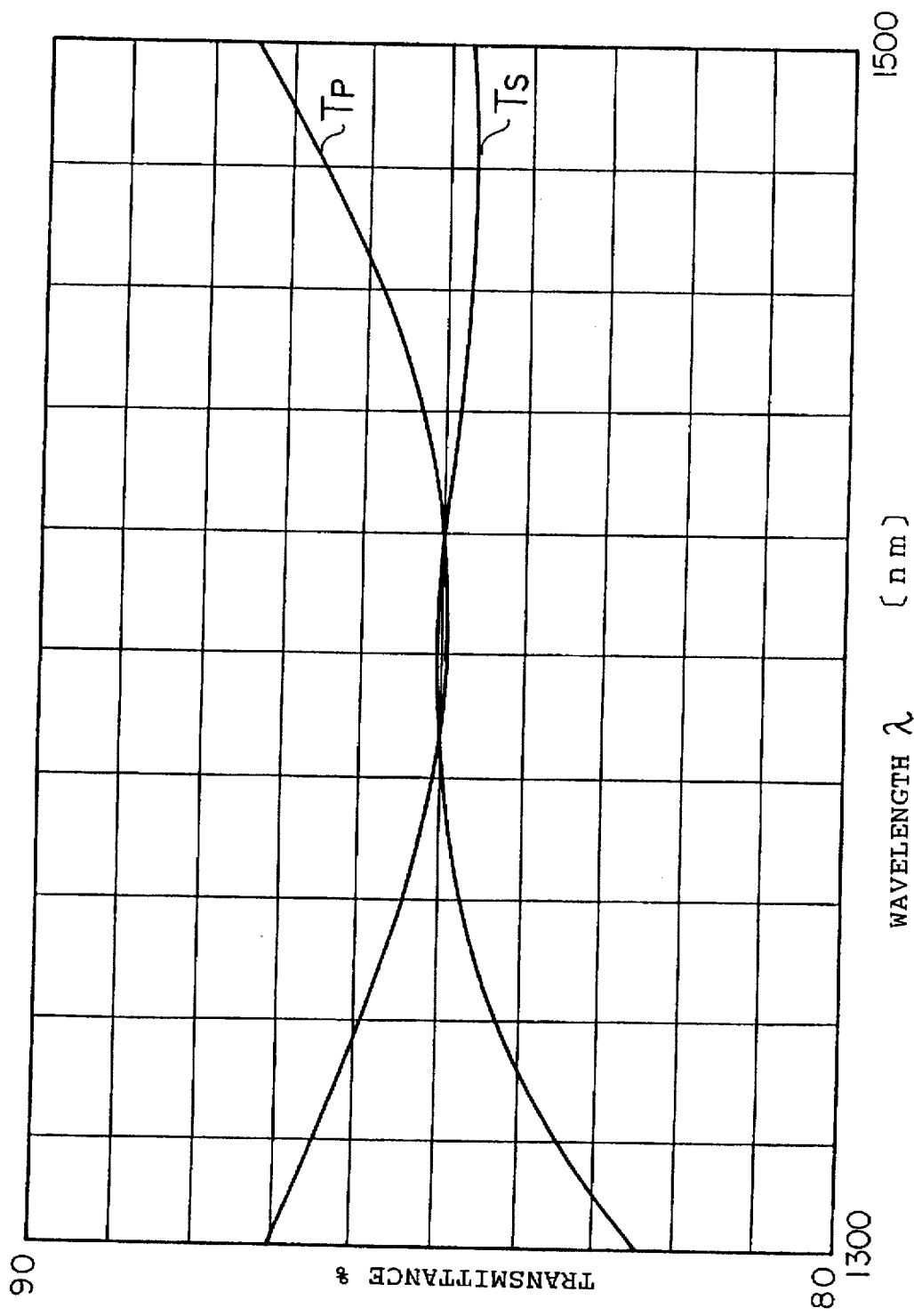
FIG. 22 is a diagram showing characteristic curves of a dividing film according to Example 2.9 of the present invention.

FIG. 22 shows characteristic curves of a dividing film according to Example 2.9. The incident angle is 45 degrees, and the dividing ratio is 1:5.7. Study of FIG. 22 shows that the polarization dependency is negligibly small in the vicinity of the wavelength λ=1400 nm.

In Example 2.10, the substrate 31 is made of silicon (Si) having a refractive index of 3.50±0.20, and a thin film of $SiO_2$ having a refractive index of 1.46±0.10 and a thin film of $TiO_2$ having a refractive index of 2.30±0.10 are deposited in eight layers on the substrate 31 as indicated below.

The types of the thin films in the first~eighth layers are represented by respective refractive indexes n1~n8, and the thin films have respective optical film thicknesses d1~d8 (λ0=1800 nm).

n1=2.30±0.10, d1=0.20~0.40
n2=1.46±0.10, d2=0.10~0.30
n3=2.30±0.10, d3=0.01~0.20
n4=1.46±0.10, d4=0.01~0.20
n5=2.30±0.10, d5=0.20~0.40
n6=1.46±0.10, d6=0.01~0.20
n7=2.30±0.10, d7=0.25~0.45
n8=1.46±0.10, d8=0.10~0.30

Figure 23:
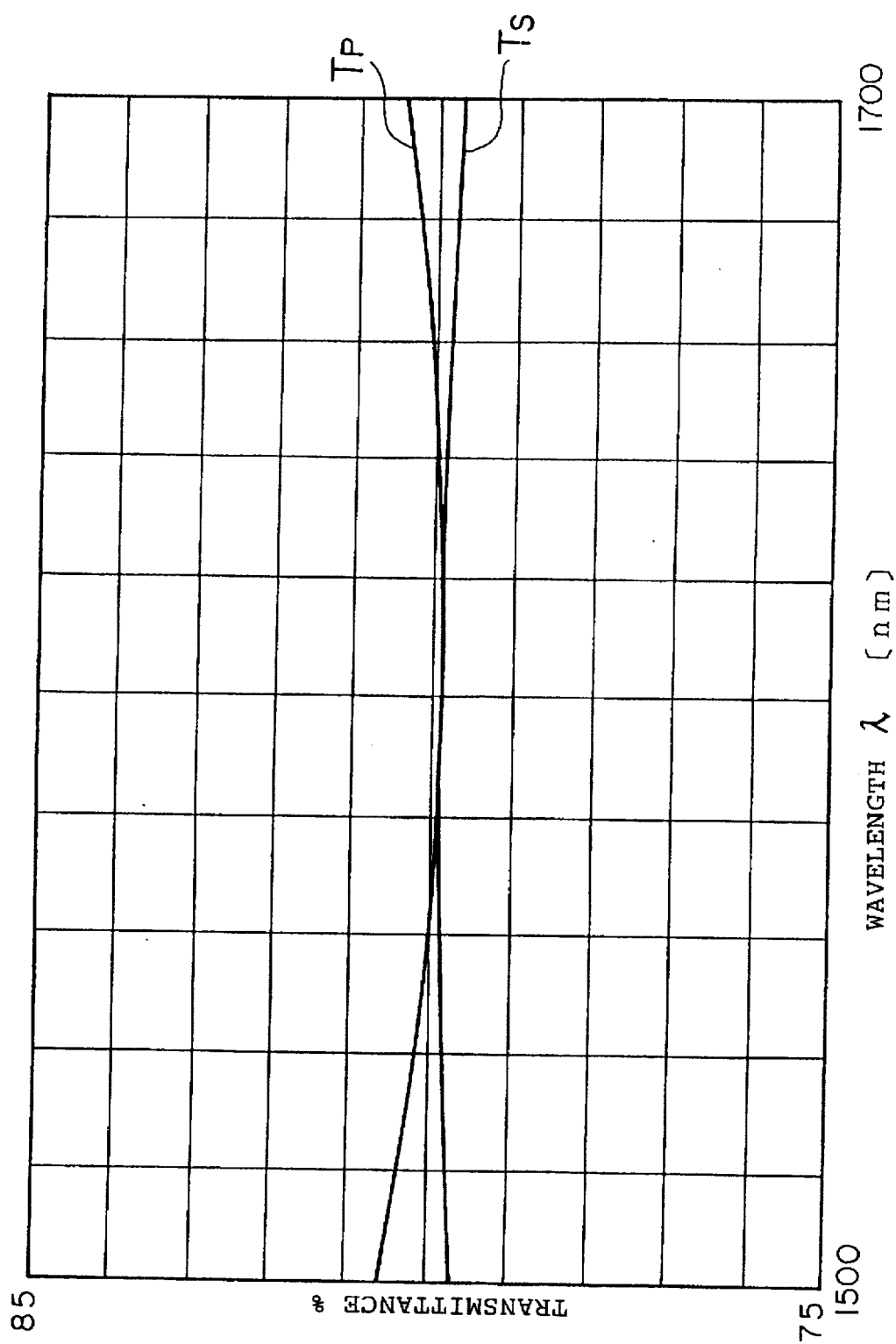
FIG. 23 is a diagram showing characteristic curves of a dividing film according to Example 2.10 of the present invention.

FIG. 23 shows characteristic curves of a dividing film according to Example 2.10. The incident angle is 45 degrees, and the dividing ratio is 1:4. It can be understood from FIG. 23 that the polarization dependency is negligibly small in the vicinity of the wavelength λ=1600 nm.

In Example 2.11, the substrate 31 is made of silicon (Si) having a refractive index of 3.50±0.20, and a thin film of $SiO_2$ having a refractive index of 1.46±0.10 and a thin film of $TiO_2$ having a refractive index of 2.30±0.10 are deposited in eight layers on the substrate 31 as indicated below.

The types of the thin films in the first~eighth layers are represented by respective refractive indexes n1~n8, and the thin films have respective optical film thicknesses d1~d8 (λ0=1550 nm).

n1=2.30±0.10, d1=0.20~0.40
n2=1.46±0.10, d2=0.01~0.20
n3=2.30±0.10, d3=0.01~0.20
n4=1.46±0.10, d4=0.01~0.20
n5=2.30±0.10, d5=0.30~0.50
n6=1.46±0.10, d6=0.10~0.30
n7=2.30±0.10, d7=0.60~0.80
n8=1.46±0.10, d8=0.20~0.40

Figure 24:
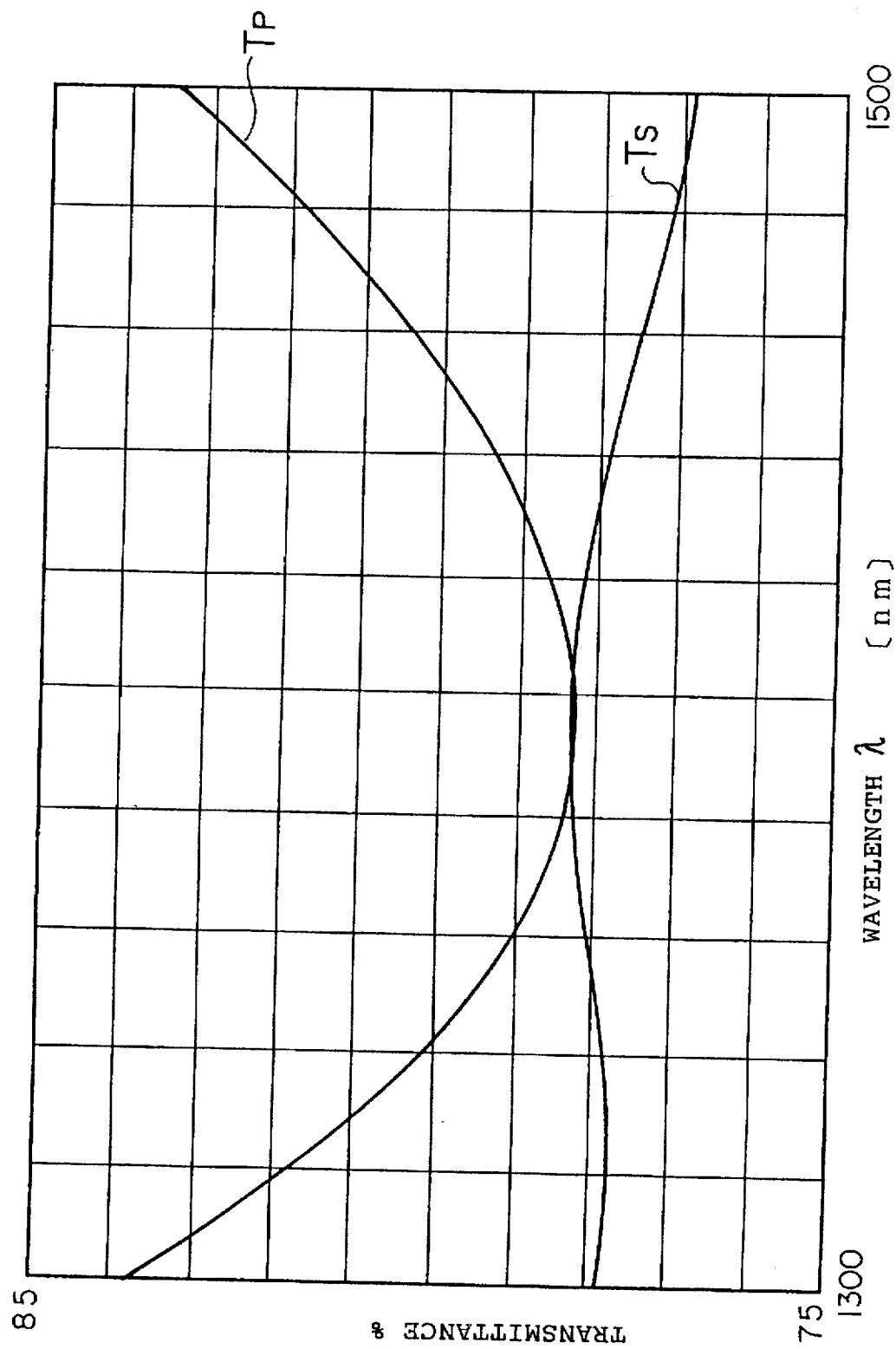
FIG. 24 is a diagram showing characteristic curves of a dividing film according to Example 2.11 of the present invention.

FIG. 24 shows characteristic curves of a dividing film according to Example 2.11. The incident angle is 45 degrees, and the dividing ratio is 1:3.6. It can be understood from FIG. 24 that the polarization dependency is negligibly small in the vicinity of the wavelength λ=1400 nm.

In Example 2.12, the substrate 31 is made of silicon (Si) having a refractive index of 3.50±0.20, and a thin film of $SiO_2$ having a refractive index of 1.46±0.10 and a thin film of $TiO_2$ having a refractive index of 2.30±0.10 are deposited in fourteen layers on the substrate 31 as indicated below.

The types of the thin films in the first~fourteenth layers are represented by respective refractive indexes n1~n14, and the thin films have respective optical film thicknesses d1~d14 (λ0=1550 nm).

n1=2.30±0.10, d1=0.20~0.40
n2=1.46±0.10, d2=0.25~0.45
n3=2.30±0.10, d3=0.01~0.20
n4=1.46±0.10, d4=0.01~0.20
n5=2.30±0.10, d5=0.20~0.40
n6=1.46±0.10, d6=0.01~0.20
n7=2.30±0.10, d7=0.20~0.40
n8=1.46±0.10, d8=0.10~0.30
n9=2.30±0.10, d9=0.20~0.40
n10=1.46±0.10, d10=0.30~0.50
n11=2.30±0.10, d11=0.30~0.50
n12=1.46±0.10, d12=0.30~0.50
n13=2.30±0.10, d13=0.20~0.40
n14=1.46±0.10, d14=0.15~0.35

Figure 25:
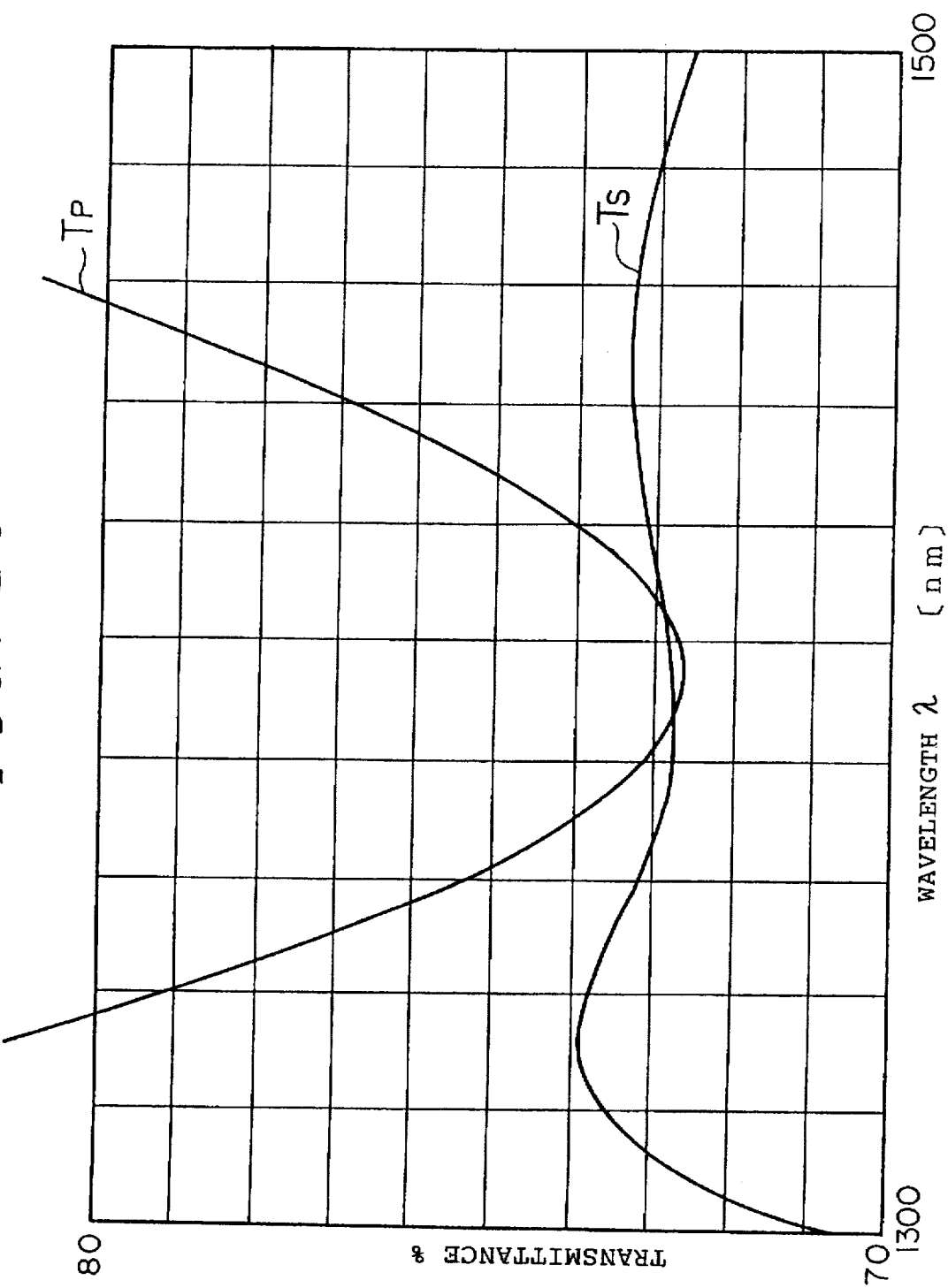
FIG. 25 is a diagram showing characteristic curves of a dividing film according to Example 2.12 of the present invention.

FIG. 25 shows characteristic curves of a dividing film according to Example 2.12. The incident angle is 45 degrees, and the dividing ratio is 1:2.7. It can be understood from FIG. 25 that the polarization dependency is negligibly small in the vicinity of the wavelength λ=1400 nm.

In Example 2.13, the substrate 31 is made of glass (BK-7) having a refractive index of 1.51±0.10, and a thin film of SiO₂ having a refractive index of 1.46 ±0.10 and a thin film of TiO₂ having a refractive index of 2.30±0.10 are deposited in four layers on the substrate 31 as indicated below.

The types of the thin films in the first–fourth layers are represented by respective refractive indexes n1–n4, and the thin films have respective optical film thicknesses d1–d4 ($\lambda 0$=1810 nm).

n1=2.30±0.10, d1=0.40–0.60 n2=1.46±0.10, d2=0.20–0.40 n3=2.30±0.10, d3=0.70–0.90 n4=1.46±0.10, d4=0.10–0.30

In Example 2.13, the optical film thickness is defined as $4n \cdot D/\lambda 0$ where n is the refractive index of the thin film, D the thickness of the film, and $\lambda 0$ the employed wavelength in the wavelength band of a signal light.

Figure 26:
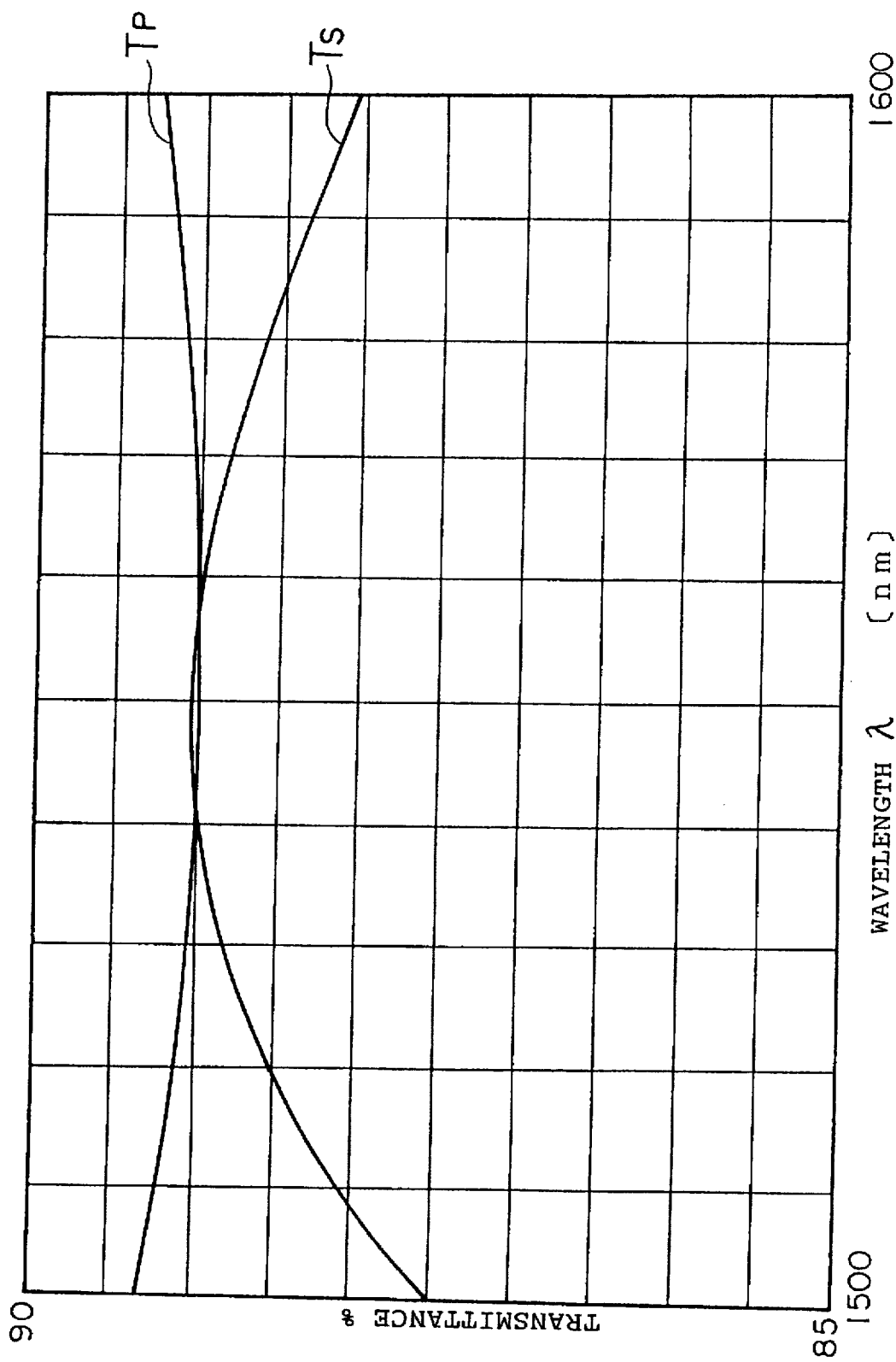
FIG. 26 is a diagram showing characteristic curves of a dividing film according to Example 2.13 of the present invention.

FIG. 26 shows characteristic curves of a dividing film according to Example 2.13. The incident angle is 45 degrees, and the dividing ratio is 1:8. It can be seen from FIG. 26 that the polarization dependency is negligibly small in the vicinity of the wavelength $\lambda$=1550 nm.

In Example 2.14, the substrate 31 is made of glass (BK-7) having a refractive index of 1.51±0.10, and a thin film of SiO₂ having a refractive index of 1.46±0.10 and a thin film of TiO₂ having a refractive index of 2.30±0.10 are deposited in six layers on the substrate 31 as indicated below.

The types of the thin films in the first–sixth layers are represented by respective refractive indexes n1–n6, and the thin films have respective optical film thicknesses d1–d6 ($\lambda 0$=1550 nm).

n1=2.30±0.10, d1=0.30–0.50 n2=1.46±0.10, d2=0.01–0.20 n3=2.30±0.10, d3=0.20–0.40 n4=1.46±0.10, d4=0.01–0.10 n5=2.30±0.10, d5=0.30–0.50 n6=1.46±0.10, d6=0.15–0.35

Figure 27:
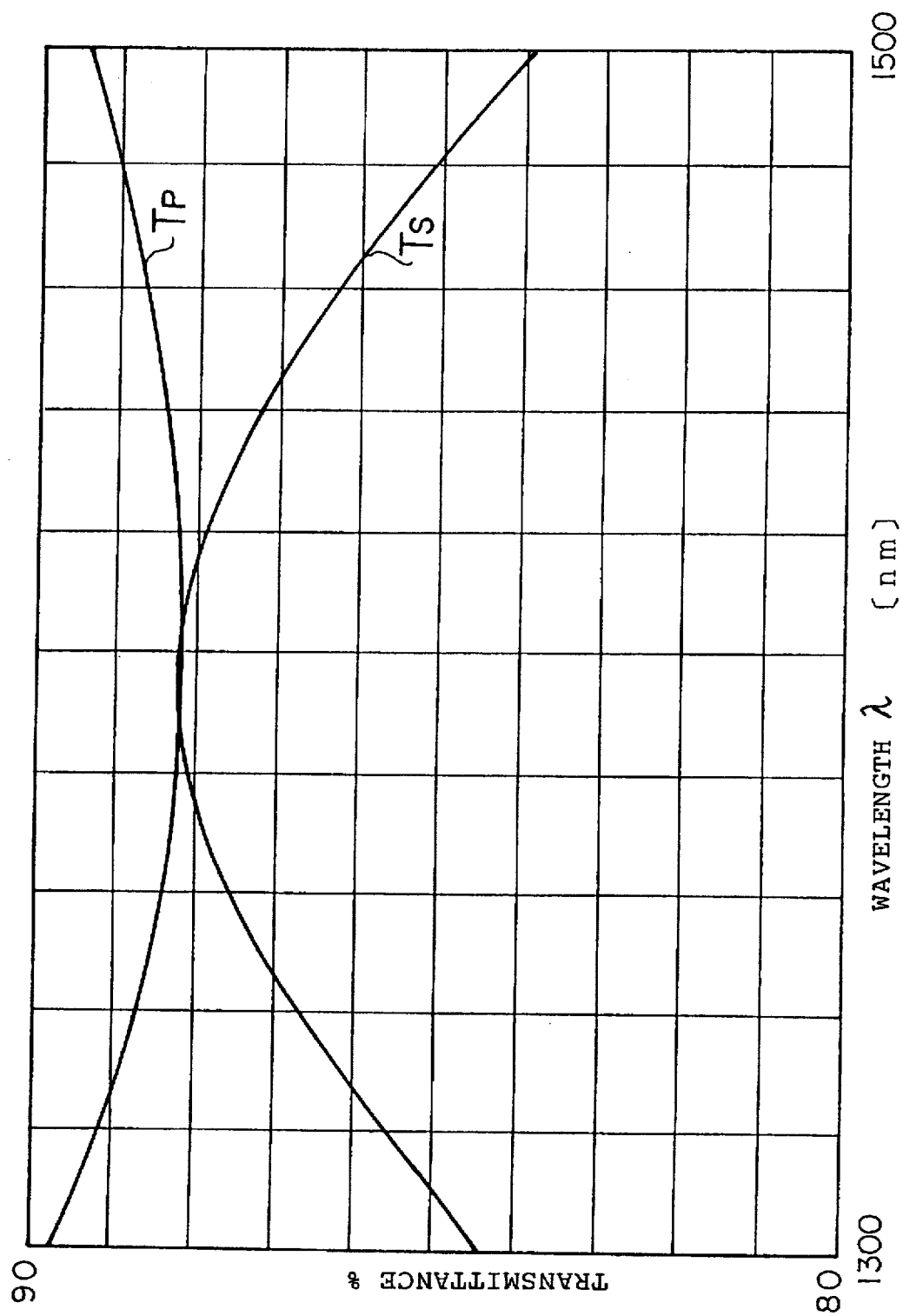
FIG. 27 is a diagram showing characteristic curves of a dividing film according to Example 2.14 of the present invention.

FIG. 27 shows characteristic curves of a dividing film according to Example 2.14. The incident angle is 45 degrees, and the dividing ratio is 1:7.5. Study of FIG. 27 indicates that the polarization dependency is negligibly small in the vicinity of the wavelength $\lambda$=1400 nm.

In Example 2.15, the substrate 31 is made of glass (BK-7) having a refractive index of 1.51±0.10, and a thin film of SiO₂ having a refractive index of 1.46 ±0.10 and a thin film of TiO₂ having a refractive index of 2.30±0.10 are deposited in eight layers on the substrate 31 as indicated below.

The types of the thin films in the first–eighth layers are represented by respective refractive indexes n1–n8, and the thin films have respective optical film thicknesses d1–d8 ($\lambda 0$=1550 nm).

n1=2.30±0.10, d1=0.45–0.65 n2=1.46±0.10, d2=0.01–0.20 n3=2.30±0.10, d3=0.15–0.35 n4=1.46±0.10, d4=0.01–0.20 n5=2.30±0.10, d5=0.15–0.35 n6=1.46±0.10, d6=0.15–0.35 n7=2.30±0.10, d7=0.55–0.75 n8=1.46±0.10, d8=0.20–0.40

Figure 28:
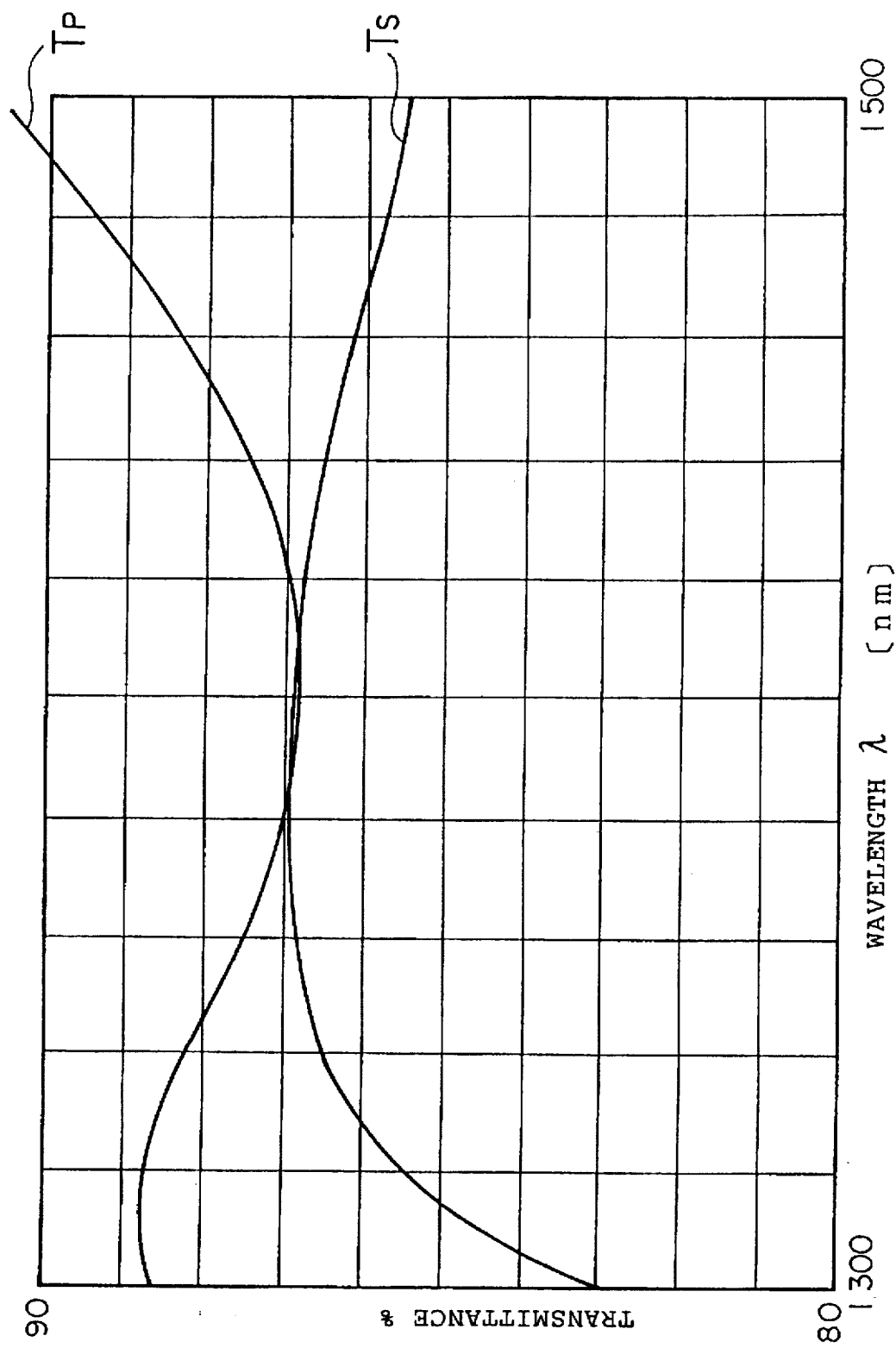
FIG. 28 is a diagram showing characteristic curves of a dividing film according to Example 2.15 of the present invention.

FIG. 28 shows characteristic cures of a dividing film according to Example 2.15. The incident angle is 45 degrees, and the dividing ratio is 1:6.6. It can be understood from FIG. 28 that the polarization dependency is negligibly small in the vicinity of the wavelength $\lambda$=1400 nm.

In Example 2.16, the substrate 31 is made of glass (BK-7) having a refractive index of 1.51±0.10, and a thin film of SiO₂ having a refractive index of 1.46 ±0.10 and a thin film of TiO₂ having a refractive index of 2.30±0.10 are deposited in ten layers on the substrate 31 as indicated below. The types of the thin films in the first–tenth layers are represented by respective refractive indexes n1–n10, and the thin films have respective optical film thicknesses d1–d10 ($\lambda 0$=1550 nm).

n1=2.30±0.10, d1=0.40–0.60 n2=1.46±0.10, d2=0.05–0.25 n3=2.30±0.10, d3=0.30–0.50 n4=1.46±0.10, d4=0.25–0.45 n5=2.30±0.10, d5=0.30–0.50 n6=1.46±0.10, d6=0.05–0.25 n7=2.30±0.10, d7=0.30–0.50 n8=1.46±0.10, d8=0.05–0.25 n9=2.30±0.10, d9=0.20–0.40 n10=1.46±0.10, d10=0.10–0.30

Figure 29:
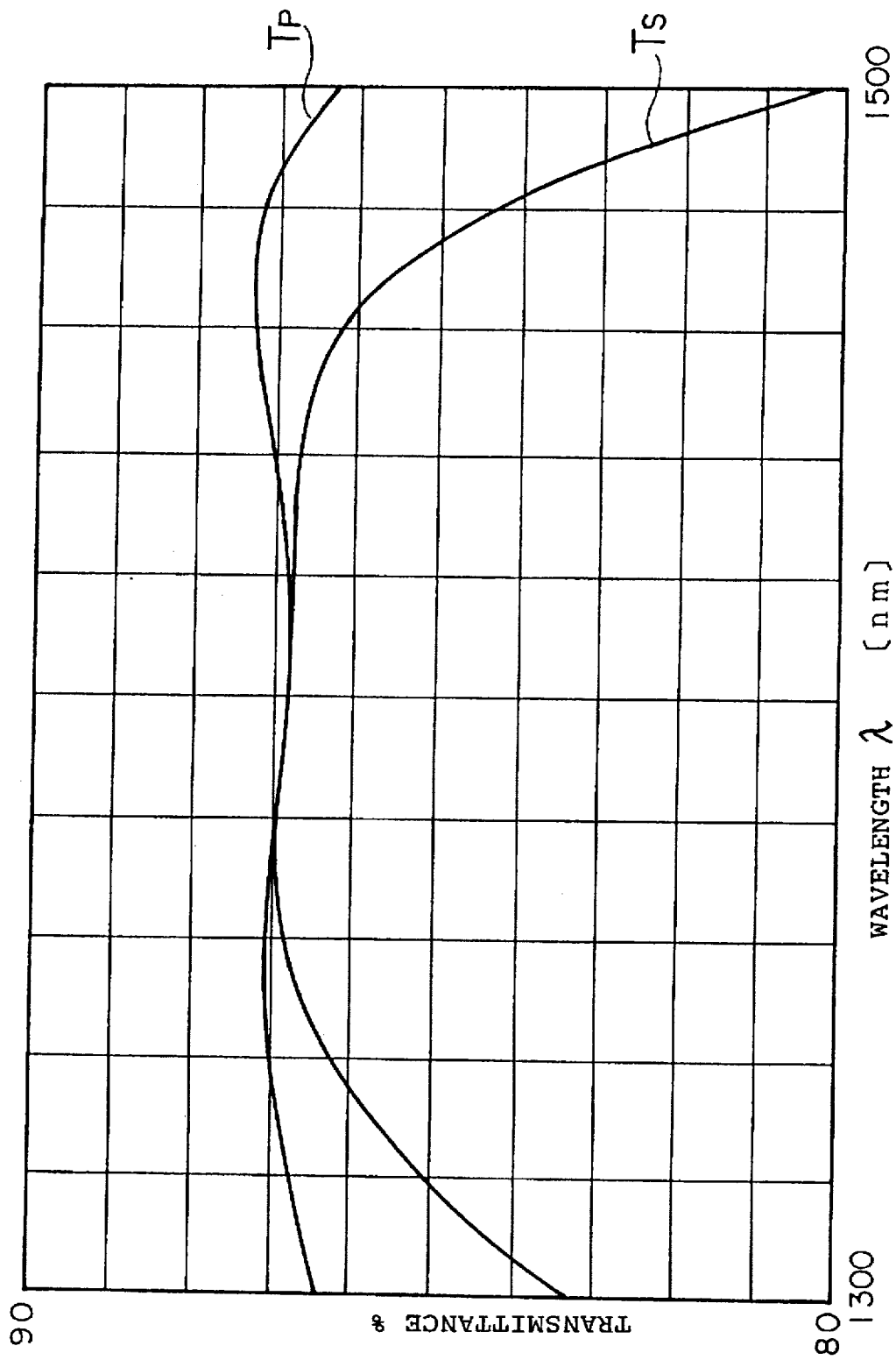
FIG. 29 is a diagram showing characteristic curves of a dividing film according to Example 2.16 of the present invention.

FIG. 29 shows characteristic curves of a dividing film according to Example 2.16. The incident angle is 45 degrees, and the dividing ratio is 1:6.6. It can be understood from FIG. 29 that the polarization dependency is negligibly small in the vicinity of the wavelength $\lambda$=1400 nm.

In Example 2.17, the substrate 31 is made of SiO₂ having a refractive index of 1.46±0.10, and a thin film of SiO₂ having a refractive index of 1.46±0.10 and a thin film of TiO₂ having a refractive index of 2.30±0.10 are deposited in four layers on the substrate 31 as indicated below.

The types of the thin films in the first–fourth layers are represented by respective refractive indexes n1–n4, and the thin films have respective optical film thicknesses d1–d4 ($\lambda 0$=1550 nm).

n1=2.30±0.10, d1=0.30–0.50 n2=1.46±0.10, d2=0.01–0.20 n3=2.30±0.10, d3=0.20–0.40 n4=1.46±0.10, d4=0.15–0.35

In Example 2.17, the optical film thickness is defined as $4n \cdot D/\lambda 0$ where n is the refractive index of the thin film, D the thickness of the film, and $\lambda 0$ the employed wavelength in the wavelength band of a signal light.

Figure 30:
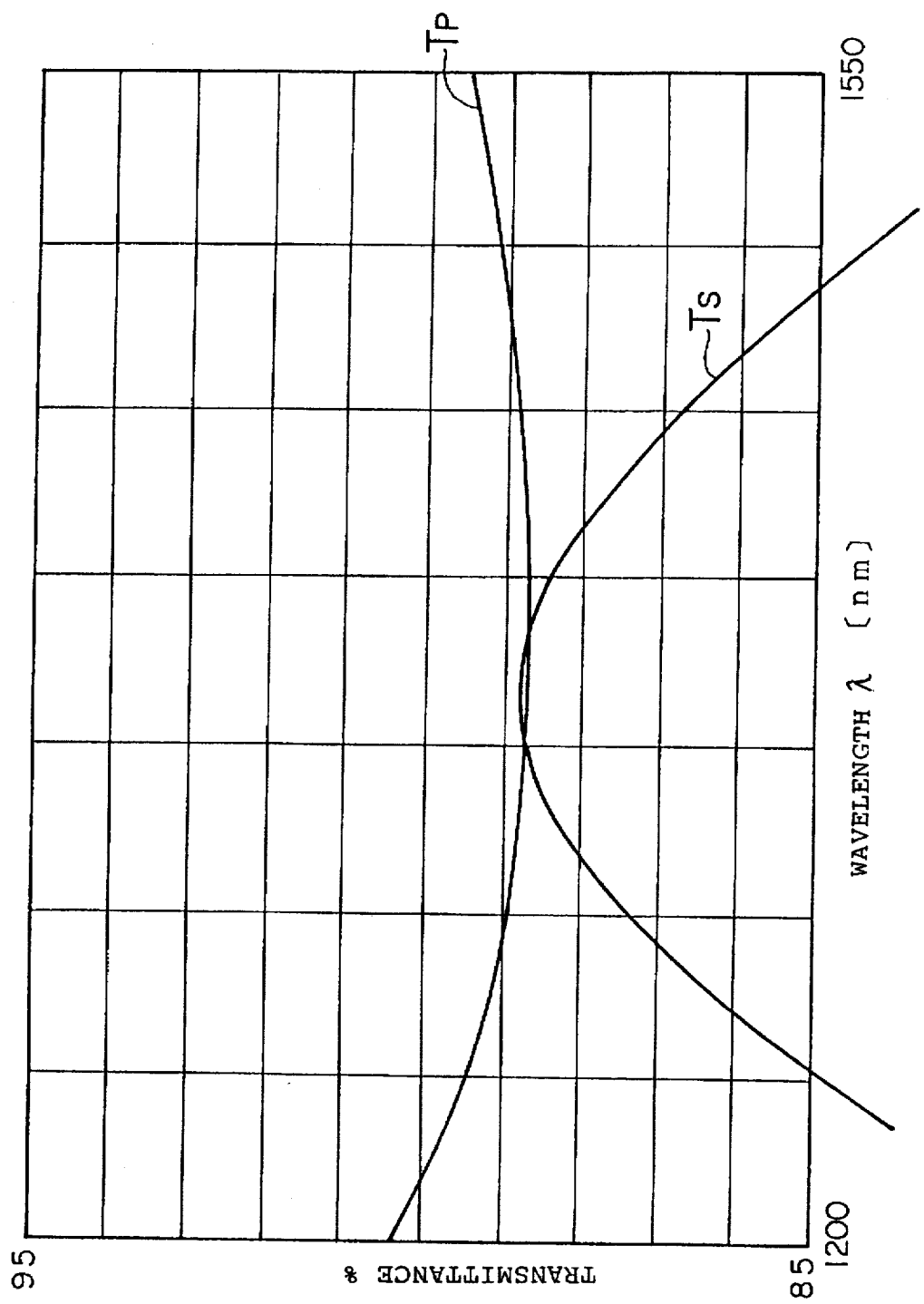
FIG. 30 is a diagram showing characteristic curves of a dividing film according to Example 2.17 of the present invention.

FIG. 30 shows characteristic curves of a dividing film according to Example 2.17. The incident angle is 45 degrees, and the dividing ratio is 1:8. It can be seen from FIG. 30 that the polarization dependency is negligibly small in the vicinity of the wavelength $\lambda$=1370 nm.

In Example 2.18, the substrate 31 is made of SiO₂ having a refractive index of 1.46±0.10, and a thin film of SiO₂ having a refractive index of 1.46±0.10 and a thin film of TiO₂ having a refractive index of 2.30±0.10 are deposited in six layers on the substrate 31 as indicated below.

The types of the thin films in the first–sixth layers are represented by respective refractive indexes n1–n6, and the thin films have respective optical film thicknesses d1–d6 ($\lambda 0$=1550 nm).

n1=2.30±0.10, d1=0.30–0.50 n2=1.46±0.10, d2=0.30–0.50 n3=2.30±0.10, d3=0.80–1.00 n4=1.46±0.10, d4=0.15–0.35 n5=2.30±0.10, d5=0.60–0.80 n6=1.46±0.10, d6=0.15–0.35

Figure 31:
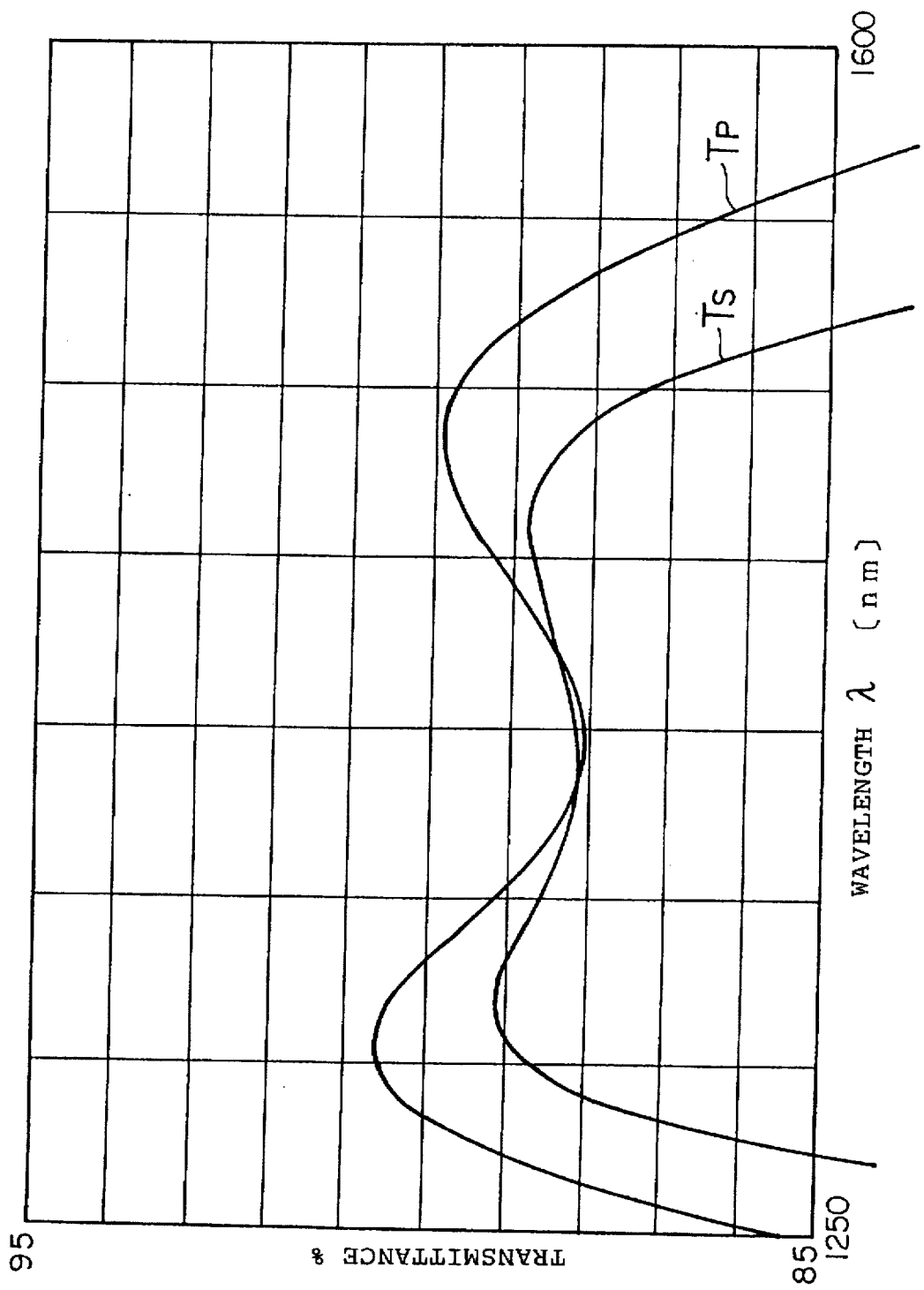
FIG. 31 is a diagram showing characteristic curves of a dividing film according to Example 2.18 of the present invention.

FIG. 31 shows characteristic curves of a dividing film according to Example 2.18. The incident angle is 45 degrees, and the dividing ratio is 1:7.4. Study of FIG. 31 indicates that the polarization dependency is negligibly small in the vicinity of the wavelength λ=1400 nm.

In Example 2.19, the substrate 31 is made of an optical glass material having a refractive index of 1.60±0.20, and a thin film of SiO₂ having a refractive index of 1.46±0.10 and a thin film of TiO₂ having a refractive index of 2.30±0.10 are deposited in four layers on the substrate 31 as indicated below. The types of the thin films in the first~fourth layers are represented by respective refractive indexes n1~n4, and the thin films have respective optical film thicknesses d1~d4 (λ0=1550 nm).

n1=2.30±0.10, d1=0.25~0.45
n2=1.46±0.10, d2=0.01~0.20
n3=2.30±0.10, d3=0.20~0.40
n4=1.46±0.10, d4=0.15~0.35

In Example 2.19, the optical film thickness is defined as 4n·D/λ0 where n is the refractive index of the thin film, D the thickness of the film, and λ0 the employed wavelength in the wavelength band of a signal light.

Figure 32:
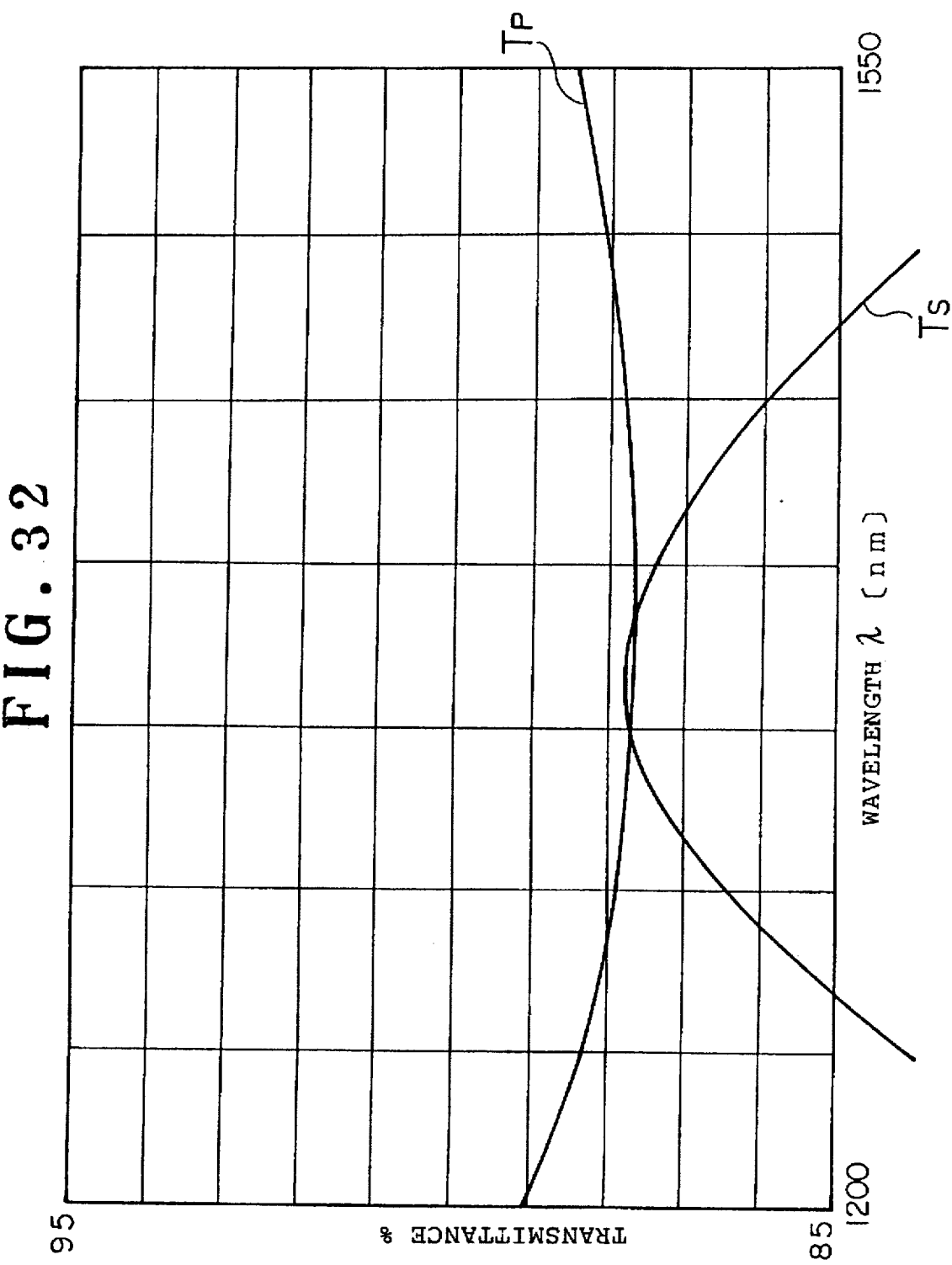
FIG. 32 is a diagram showing characteristic curves of a dividing film according to Example 2.19 of the present invention.

FIG. 32 shows characteristic curves of a dividing film according to Example 2.19. The incident angle is 45 degrees, and the dividing ratio is 1:7. It can be seen from FIG. 32 that the polarization dependency is negligibly small in the vicinity of the wavelength λ=1370 nm.

Figure 33:
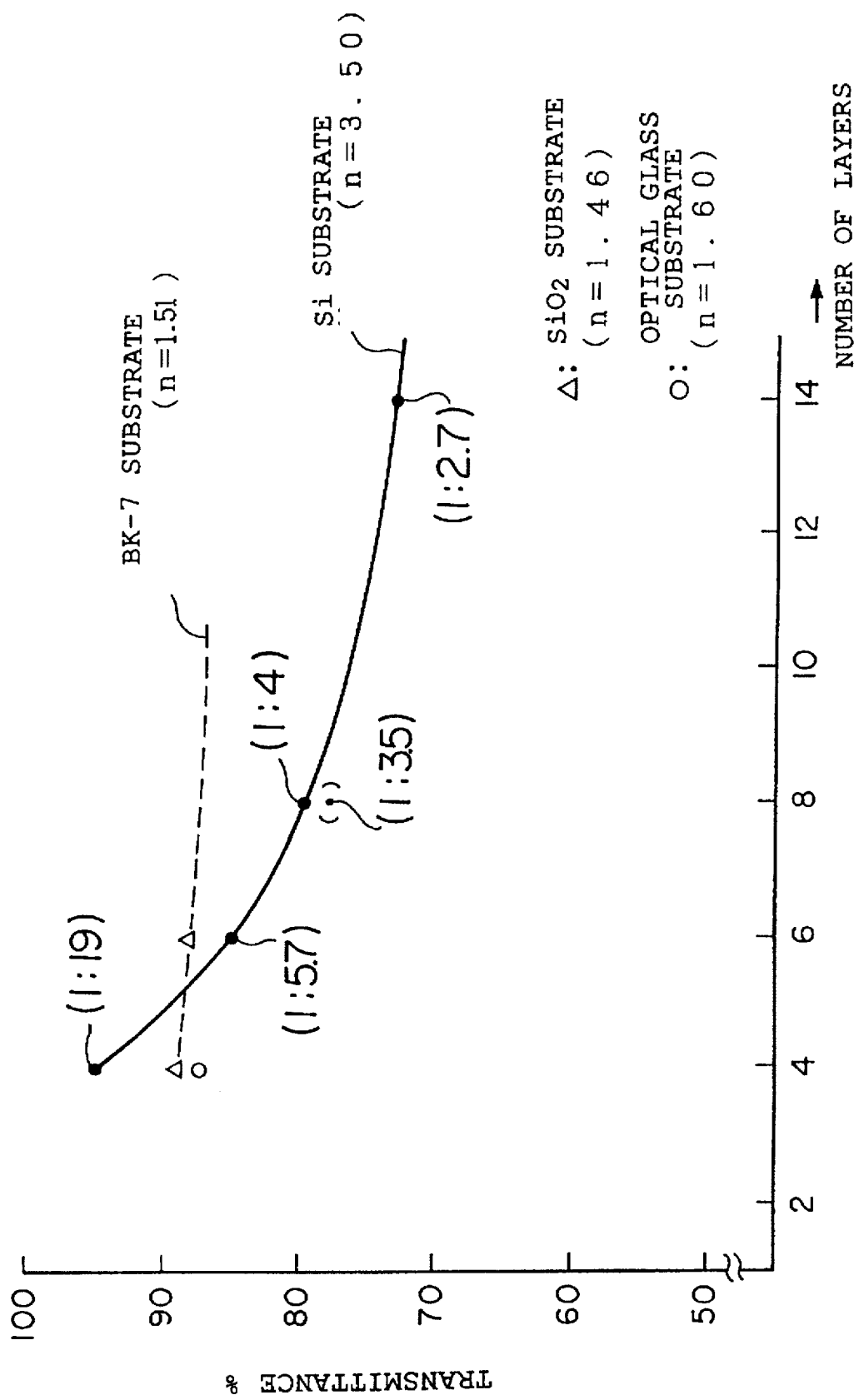
FIG. 33 is a graph showing the relationship between the number of thin films on each substrate and the transmittance in Examples.

Examples 2.1 through 2.19 are summarized as shown in FIG. 33. FIG. 33 shows the relationship between the number of thin films on each substrate and the transmittance in Examples. It can be seen from FIG. 33 that it is possible to select a dividing ratio with reduced polarization dependency by selecting the number of thin films and a substrate.

The optical couplers according to Examples 2.1 through 2.19 may be used singly, plurally, or in combination as an optical coupler or couplers for extracting monitor light. Each of the optical couplers according to Examples 2.1 through 2.19 is effective as a monitor light extracting coupler for monitoring an output signal in an optical amplifier module which includes an exciting laser diode having polarized characteristics and an erbium-doped fiber (EDF) for amplifying a signal light beam emitted from the exciting laser diode, the amplified signal light beam also having polarized characteristics.

Since the process of evaporating thin films of TiO₂ and SiO₂ is sufficiently established, the dividing films according to Examples 2.8 through 2.19 can easily and stably be produced.

We claim:

1. An optical coupler for dividing a single light beam in an optical transmission path at a predetermined ratio, comprising:
    a single-layer dividing film evaporated on a substrate as a single layer of silicon-dioxide with an optical film thickness thereof ranging from 0.23λ to 0.34λ, said film material having a refractive index which is equal to or smaller than the square root of a refractive index of said substrate; and
    holder means for holding said single-layer dividing film in the optical transmission path such that the signal light beam is applied to said single-layer dividing film at an incident angle of about 45 degrees.

2. An optical coupler according to claim 1, wherein said film material is silicon dioxide, said thickness being one of 0.23λ and 0.34λ.

3. An optical coupler according to claim 1, wherein said film material is silicon dioxide, said thickness being one of 0.23λ, 0.24λ, 0.27λ, 0.30λ, 0.32λ, and 0.33λ.

4. An optical coupler for dividing a signal light beam in an optical transmission path at a predetermined ratio to reduce polarization dependency, the signal light beam at a wavelength ranging from 1250 nm to 1600 nm, the optical coupler comprising:
    a single-layer dividing film evaporated on a silicon substrate as a single-layer of a film material with an optical film thickness thereof being of a predetermined value, said film material having a refractive index of 1.87 or smaller; and
    holder means for holding said single-layer dividing film in the optical transmission path such that the signal light beam is applied to said single-layer dividing film at an incident angle of about 45 degrees.

5. An optical coupler according to claim 4, wherein said film material is silicon dioxide, said predetermined value being one of 0.23λ and 0.34λ.

6. An optical coupler according to claim 4, wherein said film material is silicon dioxide, said predetermined value being one of 0.23λ, 0.24λ, 0.27λ, 0.30λ, 0.32λ, and 0.33λ.

7. An optical coupler for dividing a signal light beam in an optical transmission path at a predetermined ratio, comprising:
    a dividing film made of three film materials having respective refractive indexes of 1.46±0.10, 1.65±0.10, and 2.30±0.10 and formed in four, five or seven layers on a substrate having a refractive index of 1.51±0.10 to 3.50±0.20, said layers being combined in such a combination and each having such an optical film thickness as to reduce the polarization dependency of the dividing ratio of the dividing film; and
    holder means for holding said dividing film in the optical transmission path such that the signal light beam is applied to said dividing film at an incident angle of about 45 degrees.

8. An optical coupler according for monitoring an output signal in an optical amplifier module which includes an exciting laser diode having polarized characteristics and an erbium—doped fiber for amplifying a signal light beam emitted from the exciting laser diode, the amplified signal light beam also having polarized characteristics.

9. An optical coupler for dividing an incident light beam at a dividing ratio ranging from 1:4 to 1:20, comprising:
    a dividing film made of three film materials having respective refractive indexes of 1.46±0.10, 1.65±0.10, and 2.30±0.10 and formed in four or seven layers on a substrate having a refractive index of 1.51±0.10, each of said layers having an optical film thickness ranging from 0.01λ to 0.90λ to reduce the polarization dependency of the dividing ratio of the dividing film; and
    holder means for holding said dividing film in the optical transmission path such that the signal light beam is applied to said dividing film at an incident angle of about 45 degrees.

10. An optical coupler for dividing an incident light beam at a dividing ratio ranging from 1:2.7 to 1:4, comprising:
    a dividing film made of three film materials having respective refractive indexes of 1.46±0.10, 1.65±0.10, and 2.30±0.10 and formed in four layers on a substrate having a refractive index of 3.50±0.20, each of said layers having an optical film thickness ranging from 0.10λ to 0.45λ to reduce the polarization dependency of the dividing ratio of the dividing film; and
    holder means for holding said dividing film in the optical transmission path such that the signal light beams is applied to said dividing film at an incident angle of about 45 degrees.

11. An optical coupler for dividing an incident light beam at a dividing ratio ranging from 1:2.7 to 1:19, comprising:

a dividing film made of two film materials having respective refractive indexes of 1.46±0.10 and 2.30±0.10 and formed in four to ten layers on a substrate having a refractive index of 3.50±0.20, each of said layers having an optical film thickness ranging from $0.01\lambda$ to $0.80\lambda$ to reduce the polarization dependency of the dividing ratio of the dividing film; and holder means for holding said dividing film in the optical transmission path such that the signal light beam is applied to said dividing film at an incident angle of about 45 degrees.

12. An optical coupler for dividing an incident light beam at a dividing ratio ranging from 1:7.4 to 1:8, comprising:

a dividing film made of two film materials having respective refractive indexes of 1.46±0.10 and 2.30±0.10 and formed in four through six layers on a substrate having a refractive index of 1.46±0.10, each of said layers having an optical film thickness ranging from $0.01\lambda$ to $1.00\lambda$ to reduce the polarization dependency of the dividing ratio of the dividing film; and holder means for holding said dividing film in the optical transmission path such that the signal light beam is applied to said dividing film at an incident angle of about 45 degrees.

13. An optical coupler for dividing an incident light beam at a dividing ratio of 1:7, comprising:

a dividing film made of two film materials having respective refractive indexes of 1.46±0.10 and 2.30±0.10 and formed in four layers on a substrate having a refractive index of 1.60±0.20, each of said layers having an optical film thickness ranging from $0.01\lambda$ to $0.45\lambda$ as to reduce the polarization dependency of the dividing ratio of the dividing film; and holder means for holding said dividing film in the optical transmission path such that the signal light beam is applied to said dividing film at an incident angle of about 45 degrees.

14. An optical coupler for dividing a signal light beam in an optical transmission path at a predetermined ratio, comprising:

a single-layer dividing film evaporated on a silicon substrate as a single-layer of silicon dioxide with an optical film thickness thereof ranging from $0.23\lambda$ to $0.34\lambda$, said film material having a refractive index of 1.87 or smaller; and holder means for holding said single-layer dividing film in the optical transmission path such that the signal light beam is applied to said single-layer dividing film at an incident angle of about 45 degrees.

* * * * *